United States Patent
Son et al.

(10) Patent No.: US 10,637,634 B2
(45) Date of Patent: Apr. 28, 2020

(54) METHOD OF IN-BAND FULL-DUPLEX TRANSMISSION AND RECEPTION, AND APPARATUS FOR THE SAME

(71) Applicant: Electronics and Telecommunications Research Institute, Daejeon (KR)

(72) Inventors: Jung Bo Son, Daejeon (KR); Dong Hyuk Gwak, Daejeon (KR); Seon Ae Kim, Daejeon (KR); Yu Ro Lee, Daejeon (KR); Hyun Lee, Daejeon (KR); Hyung Sik Ju, Hwaseong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/134,632

(22) Filed: Sep. 18, 2018

(65) Prior Publication Data

US 2019/0207738 A1 Jul. 4, 2019

(30) Foreign Application Priority Data

Dec. 29, 2017 (KR) .................... 10-2017-0183949

(51) Int. Cl.
*H04W 52/52* (2009.01)
*H04L 5/14* (2006.01)
(Continued)

(52) U.S. Cl.
CPC ............... *H04L 5/14* (2013.01); *H04B 1/123* (2013.01); *H04B 1/525* (2013.01); *H04B 15/00* (2013.01);
(Continued)

(58) Field of Classification Search
CPC ......... H04W 52/52; H04W 4/08; H04W 4/22; H04L 5/14
See application file for complete search history.

(56) References Cited

U.S. PATENT DOCUMENTS 8,917,785 B2 12/2014 Van Nee et al.
9,344,146 B2 5/2016 Lusted et al.
(Continued)

FOREIGN PATENT DOCUMENTS

EP 3057248 A1 8/2016
KR 10-2014-0025264 A 3/2014
(Continued)

*Primary Examiner* — Wei Zhao
(74) *Attorney, Agent, or Firm* — Rabin & Berdo, P.C.

(57) ABSTRACT

An operating method of a slave node that communicates with a master node in an in-band full duplex (IFD) system may comprise receiving a beacon signal from the master node during a training sequence period; transmitting a first self-interference (SI) training sequence including a first radio frequency (RF)/analog SI training sequence, a first automatic gain control (AGC) sequence, and a first digital SI training sequence to the master node during the training sequence period after the beacon signal is received; calculating a filter factor for canceling an analog SI signal input to the slave node on the basis of the first RF/analog SI training sequence; and canceling the analog SI signal from the first AGC sequence on the basis of the filter factor.

20 Claims, 12 Drawing Sheets

(51) Int. Cl.
  *H04B 15/00*    (2006.01)
  *H04B 1/525*    (2015.01)
  *H04W 52/24*    (2009.01)
  *H04B 1/12*     (2006.01)

(52) U.S. Cl.
  CPC ....... *H04W 52/243* (2013.01); *H04W 52/245* (2013.01); *H04W 52/52* (2013.01)

(56) References Cited

U.S. PATENT DOCUMENTS

| | | |
|---|---|---|
| 9,401,740 B2 | 7/2016 | Nair et al. |
| 9,635,705 B2 * | 4/2017 | Lu .......................... H04W 60/00 |
| 9,912,467 B2 * | 3/2018 | Alpert ....................... H04L 5/14 |
| 2015/0016309 A1 | 1/2015 | Fang et al. |
| 2016/0233904 A1 | 8/2016 | Wu et al. |
| 2016/0380799 A1 | 12/2016 | Chang et al. |
| 2017/0019937 A1 * | 1/2017 | Kim ......................... H04W 8/26 |
| 2017/0041060 A1 | 2/2017 | Kim et al. |
| 2017/0237545 A1 | 8/2017 | Khandani |

FOREIGN PATENT DOCUMENTS

| | | |
|---|---|---|
| KR | 10-2014-0124842 A | 10/2014 |
| KR | 10-2015-0106917 A | 9/2015 |
| WO | WO-2015/053971 A1 | 4/2015 |
| WO | WO-2017/052937 A1 | 3/2017 |

\* cited by examiner

FIG. 2
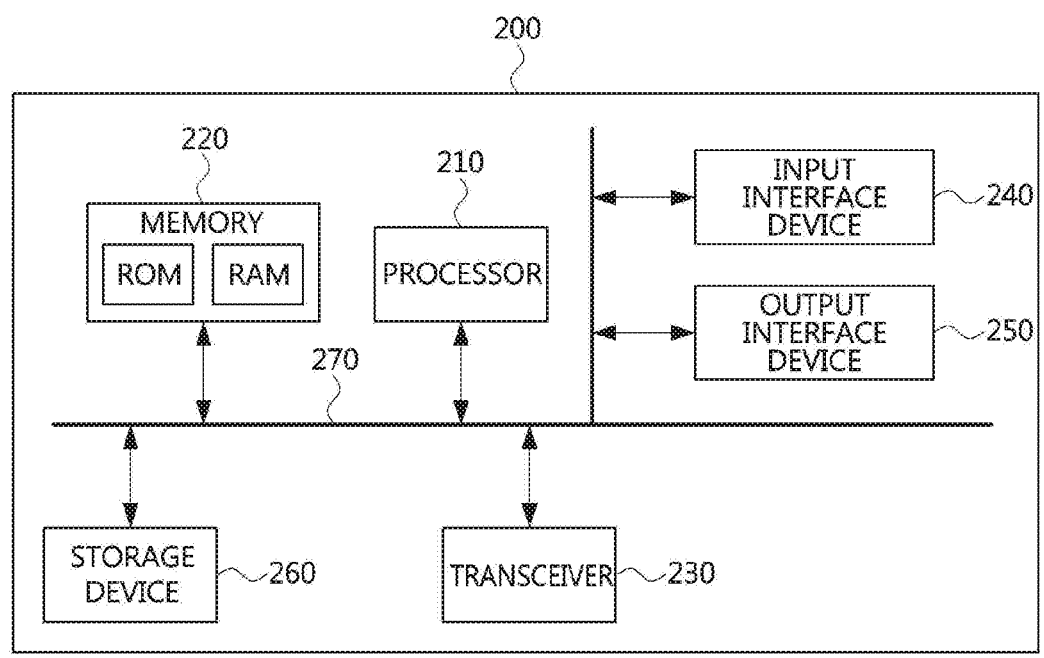
FIG. 3
Pair-wise IFD
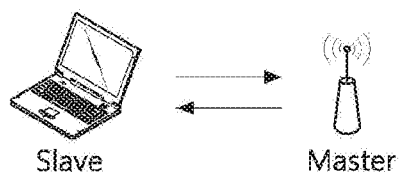
Unrestricted IFD
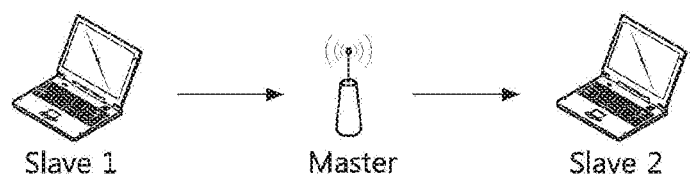

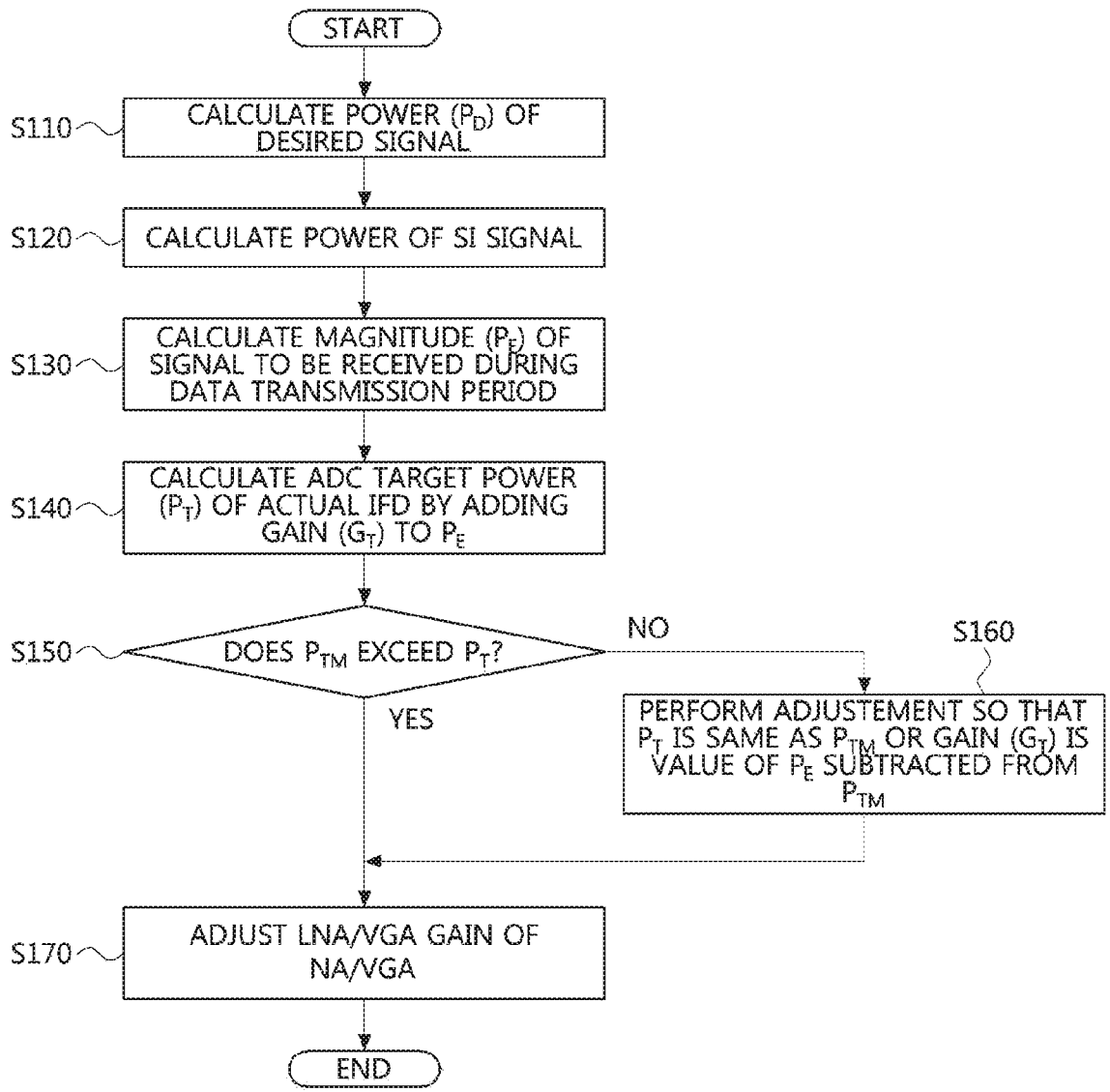

METHOD OF IN-BAND FULL-DUPLEX TRANSMISSION AND RECEPTION, AND APPARATUS FOR THE SAME

CLAIM FOR PRIORITY

This application claims priority to Korean Patent Application No. 2017-0183949 filed on Dec. 29, 2017 in the Korean Intellectual Property Office (KIPO), the entire contents of which are hereby incorporated by reference.

BACKGROUND

1. Technical Field

Example embodiments of the present invention generally relate to a method and apparatus for in-band full-duplex (IFD) transmission and reception and more specifically to an IFD transceiving method and apparatus that is capable of automatic gain control (AGC) by performing magnitude matching between a desired signal (DS) and a self-interference (SI) signal input to an analog-to-digital converter (ADC).

2. Related Art

In-band full-duplex (IFD), which is a technology for simultaneously transmitting and receiving signals in the same band, can theoretically increase link capacity to up to twice as much as a general half-duplex (HD). Attempts have been made to apply the IFD technology capable of increasing frequency efficiency to various wireless communication technology standards. For example, the IFD technology has been discussed as one of the candidate technologies of IEEE802.11ax, which is a new standard of the wireless LAN. In Europe, leading technology research has been conducted through a full DUPlex radio for LOcal access (DUPLO) project and has been discussed as a standardization item of the 3rd generation partnership project (3GPP).

The IFD scheme has a problem in that a self-transmitted signal enters a receiver to cause generation of a self-interference (SI) signal much stronger than a desired signal (DS). Accordingly, the SI should be canceled in order to achieve smooth communication in the IFD scheme. However, generally, Self-Interference Cancellation (SIC) technology has increased complexity in implementation of a transceiver. In particular, when the IFD transmission/reception technology is extended to a multiple-input multiple-output (MIMO) system, there is a problem in that the complexity in implementation of the transceiver becomes worse due to application of the SIC. In the IFD system, a self-transmitted signal enter a receiver and acts as an SI signal stronger than a DS to make reception difficult.

It is difficult to cancel all SI signals, which have high strength and enter the receiver of the IFD system, at one time. Accordingly, some of the SI signals may be canceled at a radio frequency (RF)/analog stage, and the residual SI signals may be canceled in a digital area via an analog-to-digital converter (ADC) block.

Here, the magnitude (strength) of a signal inputtable to an ADC used in the system is limited by the ADC. While the signal passes through the RF/analog stage of the receiver, the magnitude of the signal should be appropriately adjusted. Thus, the ADC is not saturated and also a signal-to-noise ratio (SNR) of a desired signal is obtained so that the signal may be normally received.

In particular, since a signal entering a receiver of an IFD system includes a desired signal (DS) in addition to a self-interference (SI) signal, automatic gain control (AGC) should be achieved at the RF/analog stage in consideration of this inclusion.

SUMMARY

Accordingly, example embodiments of the present invention are provided to substantially obviate one or more problems due to limitations and disadvantages of the related art.

Example embodiments of the present invention provide an in-band full-duplex (IFD) transceiving method and apparatus that is capable of automatic gain control (AGC) by performing magnitude matching between a desired signal (DS) and a self-interference (SI) signal input to an analog-to-digital converter (ADC).

According to example embodiments of the present invention, there is provided an operating method of a slave node that communicates with a master node in an in-band full duplex (IFD) system, the operating method comprises receiving a beacon signal from the master node during a training sequence period, transmitting a first self-interference (SI) training sequence including a first radio frequency (RF)/analog SI training sequence, a first automatic gain control (AGC) sequence, and a first digital SI training sequence to the master node during the training sequence period after the beacon signal is received, calculating a filter factor for canceling an analog SI signal input to the slave node on the basis of the first RF/analog SI training sequence, and canceling the analog SI signal from the first AGC sequence on the basis of the filter factor.

The operating method further comprises adjusting gain of a data signal on the basis of strength of the beacon signal and strength of a residual SI signal remaining after the analog SI signal is canceled from the first AGC sequence, calculating a digital filter factor for canceling the residual SI signal on the basis of the first digital SI training sequence after the gain of the data signal is adjusted, and canceling the residual SI signal on the basis of the digital filter factor and the adjusted gain, demodulating the data signal received from the master node according to an IFD scheme during a data transmission period after the training sequence period.

Here, the adjusting of the gain of the data signal comprises calculating a third strength by adding a first strength of a desired signal measured based on the beacon signal to a second strength of the residual SI signal and adjusting the gain of the data signal on the basis of the third strength.

Here, the gain of the data signal is adjusted to be within a dynamic range of an analog-to-digital converter (ADC) of the slave node.

Here, the beacon signal includes an IFD information field and a sequence field for signal sensing and gain adjustment.

Here, the first ACG sequence of the first SI training sequence is located between the first RF/analog SI training sequence and the first digital SI training sequence.

The operating method further receiving a second SI training sequence from the master node after transmitting the first SI training sequence, wherein the second SI training sequence is used by the master node to cancel an SI signal, and the data signal is received from the master node during the data transmission period after the second SI training sequence is received.

Here, the second SI training sequence includes a second RF/analog SI training sequence, a second AGC sequence, and a second digital SI training sequence, and the second AGC sequence is located between the second RF/analog SI training sequence and the second digital SI training sequence.

In some example embodiment, an operating method of a master node that communicates with a slave node in an in-band full duplex (IFD) system, the operating method comprises transmitting a beacon signal during a training sequence period, receiving a first self-interference (SI) training sequence from the slave node after the slave node receives the beacon signal during the training sequence period, transmitting a second SI training sequence including a second radio frequency (RF)/analog SI training sequence, a second automatic gain control (AGC) sequence, and a second digital SI training sequence to the slave node during the training sequence period after the first SI training sequence is received, calculating a filter factor for canceling an analog SI signal input to the master node on the basis of the second RF/analog SI training sequence, and canceling the analog SI signal from the second AGC sequence on the basis of the filter factor.

The operating method further comprises adjusting gain of a data signal on the basis of strength of the first SI training sequence and strength of a residual SI signal remaining after the analog SI signal is canceled from the second AGC sequence, calculating a digital filter factor for canceling the residual SI signal on the basis of the second digital SI training sequence after the gain of the data signal is adjusted, and canceling the residual SI signal on the basis of the digital filter factor and the adjusted gain, demodulating the data signal received from the slave node according to an IFD scheme during a data transmission period after the training sequence period.

Here, the adjusting of the gain of the data signal comprises calculating a third strength by adding a first strength of a desired signal measured on the basis of the first SI training sequence to a second strength of the residual SI signal and adjusting the gain of the data signal on the basis of the third strength.

Here, the gain of the data signal is adjusted to be within a dynamic range of an analog-to-digital converter (ADC) of the master node.

Here, the beacon signal includes an IFD information field and a sequence field for signal sensing and gain adjustment.

Here, the first SI training sequence includes a first RF/analog SI training sequence, a first AGC sequence, and a first digital SI training sequence and is used by the slave node to cancel an SI signal.

In some example embodiment, a slave node that communicates with a master node in an in-band full duplex (IFD) system, the slave node comprises a processor and a memory configured to store at least one command executed by the processor, wherein the at least one command is executed to receive a beacon signal from the master node during a training sequence period, transmit a first self-interference (SI) training sequence including a first radio frequency (RF)/analog SI training sequence, a first automatic gain control (AGC) sequence, and a first digital SI training sequence to the master node during the training sequence period after the beacon signal is received, calculate a filter factor for canceling an analog SI signal input to the slave node on the basis of the first RF/analog SI training sequence and cancel the analog SI signal from the first AGC sequence on the basis of the filter factor.

Here, the at least one command is further executed to adjust gain of the data signal on the basis of strength of the beacon signal and strength of a residual SI signal remaining after the analog SI signal is canceled from the first AGC sequence, calculate a digital filter factor for canceling the residual SI signal on the basis of the first digital SI training sequence after the gain of the data signal is adjusted and cancel the residual SI signal on the basis of the digital filter factor and the adjusted gain, demodulate the data signal received from the master node according to an IFD scheme during a data transmission period after the training sequence period.

Here, when the gain of the beacon signal is adjusted, the at least one command is executed to calculate a third strength by adding a first strength of a desired signal measured based on the beacon signal to a second strength of the residual SI signal and adjust the gain of the data signal on the basis of the third strength.

Here, the gain of the data signal is adjusted to be within a dynamic range of an analog-to-digital converter (ADC) of the slave node.

Here, the beacon signal includes an IFD information field and a sequence field for signal sensing and gain adjustment.

Here, the at least one command is further executed to receive a second SI training sequence from the master node after transmitting the first SI training sequence and wherein the second SI training sequence is used by the master node to cancel an SI signal, and the data signal is received from the master node during the data transmission period after the second SI training sequence is received.

BRIEF DESCRIPTION OF DRAWINGS

Example embodiments of the present invention will become more apparent by describing in detail example embodiments of the present invention with reference to the accompanying drawings, in which:

FIG. 2 is a block diagram showing a first embodiment of a communication node, which is one element of a communication system;

FIG. 3 is a conceptual view showing a configuration of an In-band Full Duplex (IFD) communication system;

FIG. 17 is a flowchart showing a gain adjustment method of an RF/analog receiver.

DESCRIPTION OF EXAMPLE EMBODIMENTS

Figure 1:
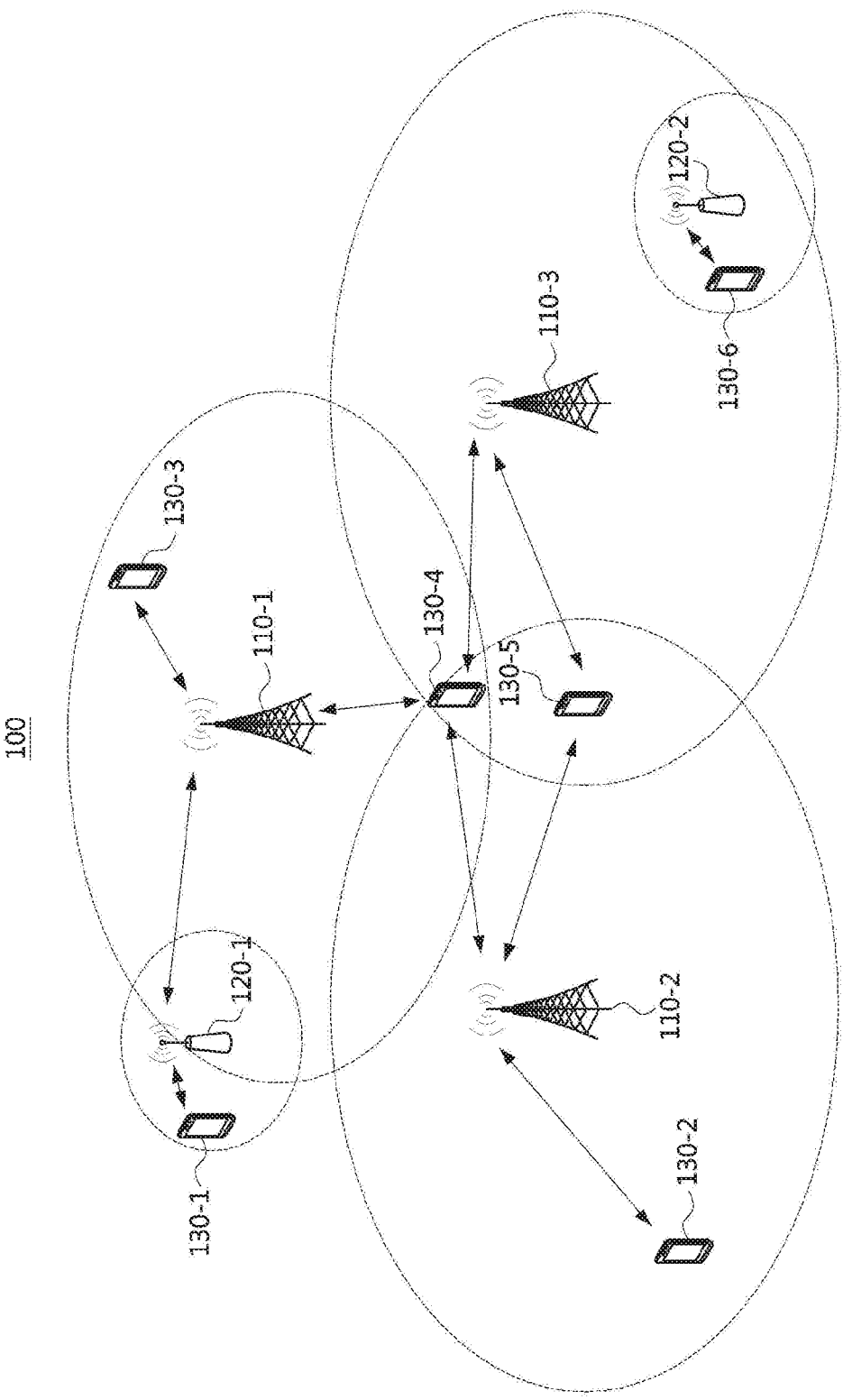
FIG. 1 is a conceptual view showing a first embodiment of a communication system.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

FIG. 1 is a conceptual view showing a first embodiment of a communication system.

Referring to FIG. 1, a communication system 100 may be composed of a plurality of communication nodes 110-1, 110-2, 110-3, 120-1, 120-2, 130-1, 130-2, 130-3, 130-4, 130-5, and 130-6. Here, the communication system 100 may refer to a "communication network." Each of the plurality of communication nodes may support at least one communication protocol. For example, each of the plurality of communication nodes may support a code division multiple access (CDMA)-based communication protocol, a wideband CDMA (WCDMA)-based communication protocol, a time division multiple access (TDMA)-based communication protocol, a frequency division multiple access (FDMA)-based communication protocol, an orthogonal frequency division multiplexing (OFDM)-based communication protocol, an orthogonal frequency division multiple access (OFDMA)-based communication protocol, a single carrier (SC) FDMA-based communication protocol, a non-orthogonal multiple access (NOMA)-based communication protocol, a space division multiple access (SDMA)-based communication protocol, or the like. Each of the plurality of communication nodes may have structures that will be described.

FIG. 2 is a block diagram showing a first embodiment of a communication node, which is one element of a communication system.

Referring to FIG. 2, a communication node 200 may include at least one processor 210, a memory 220, and a transceiving device 230 connected to a network and configured to perform communication. Also, the communication node 200 may further include an input interface device 240, an output information device 250, a storage device 260, etc. Elements included in the communication node 200 are connected to, and communicate with, one another through a bus 270.

The processor 210 may execute a program command stored in at least one of the memory 220 and the storage device 260. The processor 210 may refer to a central processing unit (CPU), a graphics processing unit (GPU), or a dedicated processor by which methods according to embodiments of the present invention are performed. Each of the memory 220 and the storage device 260 may be composed of at least one of volatile and non-volatile storage media. For example, the memory 220 may be composed of at least one of a read only memory (ROM) and a random access memory (RAM).

Referring to FIG. 1 again, the communication system 100 may include a plurality of base stations 110-1, 110-2, 110-3, 120-1, and 120-2 and a plurality of user equipments 130-1, 130-2, 130-3, 130-4, 130-5, and 130-6. The first base station 110-1, the second base station 110-2, and the third base station 110-3 may each form a macro cell. The fourth base station 120-1 and the fifth base station 120-2 may each form a small cell. The fourth base station 120-1, the third terminal 130-3, and the fourth terminal 130-4 may be covered within the first base station 110-1. The second terminal 130-2, the fourth terminal 130-4, and the fifth terminal 130-5 may be covered within the second base station 110-2. The fifth base station 120-2, the fourth terminal 130-4, the fifth terminal 130-5, and the sixth terminal 130-6 may be covered within the third base station 110-3. The first terminal 130-1 may be covered within the fourth base station 120-1. The sixth terminal 130-6 may be covered within the fifth base station 120-2.

Here, each of the plurality of base station 110-1, 110-2, 120-1, and 120-2 may refer to a NodeB, an evolved NodeB, a base transceiver station (BTS), a radio base station, a radio transceiver, an access point, an access node, a road side unit (RSU), a radio remote head (ROH), a transmission point (TP), a transmission and reception point (TRP), a relay node, or the like. Each of the plurality of terminals 130-1, 130-2, 130-3, 130-4, 130-5, and 130-6 may refer to a terminal, an access terminal, a mobile terminal, a station, a subscriber station, a mobile terminal, a portable subscriber station, a node, a device, or the like.

Each of the plurality of communication nodes 110-1, 110-2, 110-3, 120-1, 120-2, 130-1, 130-2, 130-3, 130-4, 130-5, and 130-6 may support cellular communication (e.g., long term evolution (LTE), LTE-advanced (LTE-A), and the like, which are defined in a 3rd generation partnership project (3GPP) standard). Each of the plurality of base stations 110-1, 110-2, 110-3, 120-1, and 120-2 may operate in different frequency bands or may operate in the same frequency band. Each of the plurality of base stations 110-1, 110-2, 110-3, 120-1, and 120-2 may be connected to, and exchange information with, one another through ideal backhaul or non-ideal backhaul. Each of the plurality of base stations 110-1, 110-2, 110-3, 120-1, and 120-2 may be connected to a core network (not shown) through ideal backhaul or non-ideal backhaul. Each of the plurality of base stations 110-1, 110-2, 110-3, 120-1, and 120-2 may transmit a signal received from the core network to a corresponding terminal 130-1, 130-2, 130-3, 130-4, 130-5, and 130-6, and may transmit a signal received from the corresponding terminal 130-1, 130-2, 130-3, 130-4, 130-5, and 130-6 to the core network.

Each of the plurality of base stations 110-1, 110-2, 110-3, 120-1, and 120-2 may support downlink transmission based on OFDMA and may support uplink transmission based on SC-FDMA. Also, each of the plurality of base stations 110-1, 110-2, 110-3, 120-1, and 120-2 may support multiple input multiple output (MIMO) transmission (e.g., single user (SU)-MIMO, multi user (MU)-MIMO, massive MIMO, etc.), coordinated multipoint (CoMP) transmission, carrier aggregation transmission, unlicensed-band transmission, device-to-device (D2D) communication (or proximity services (ProSe)), and the like. Here, each of the plurality of terminals may perform operations corresponding to the base stations 110-1, 110-2, 110-3, 120-1, and 120-2 and operations supported by the base stations 110-1, 110-2, 110-3, 120-1, and 120-2.

For example, the second base station 110-2 may transmit a signal to the fourth terminal 130-4 on the basis of SU-MIMO, and the fourth terminal 130-4 may receive a signal from the second base station 110-2 on the basis of SU-MIMO. Alternatively, the second base station 110-2 may transmit a signal to the fourth terminal 130-4 and the fifth terminal 130-5 on the basis of MU-MIMO, and each of the fourth terminal 130-4 and the fifth terminal 130-5 may receive a signal from the second base station 110-2 on the basis of MU-MIMO. Each of the first base station 110-1, the second base station 110-2, and the third base station 110-3 may transmit a signal to the fourth terminal 130-4 on the basis of CoMP, and the fourth terminal 130-4 may receive a signal from the first base station 110-1, the second base station 110-2, and the third base station 110-3. Each of the plurality of base stations 110-1, 110-2, 110-3, 120-1, and 120-2 may transmit and receive signals to and from, respectively, a corresponding terminal 130-1, 130-2, 130-3, 130-4, 130-5, or 130-6 being covered within itself on the basis of carrier aggregation. Each of the first base station 110-1, the second base station 110-2, and the third base station 110-3 may coordinate D2D communication between the fourth terminal 130-4 and the fifth terminal 130-5, and the fourth terminal 130-4 and the fifth terminal 130-5 may respectively perform D2D communication by coordinate of the second base station 110-2 and the third base station 110-3.

Meanwhile, the communication system may support a frequency division duplex (FDD) scheme, a time division duplex (TDD) scheme, etc. An FDD-based frame may be defined as a "type-1 frame," and a TDD-based frame may be defined as a "type-2 frame."

FIG. 3 is a conceptual view showing a configuration of an In-band Full Duplex (IFD) communication system.

Referring to FIG. 3, the IFD communication system may be classified into a Pair-wise IFD communication scheme and an Unrestricted IFD communication scheme. In the Pair-wise IFD communication scheme, IFD communication may be performed between a master node and a slave node, each of which may include an IFD transceiving device shown in FIG. 5. The IFD transceiving device will be described below with reference to FIG. 5. In the Unrestricted IFD communication scheme, a master node may receive data from a first slave node and transmit data to a second slave node by means of the IFD transceiving device. At this time, the first slave node and the second slave node may only perform transmission or reception in the half-duplex (HP) scheme at the same time.

An automatic gain control (AGC) method and an IFD frame for AGC of an IFD receiver in the Pair-wise IFD communication system will be proposed below.

Figure 4:
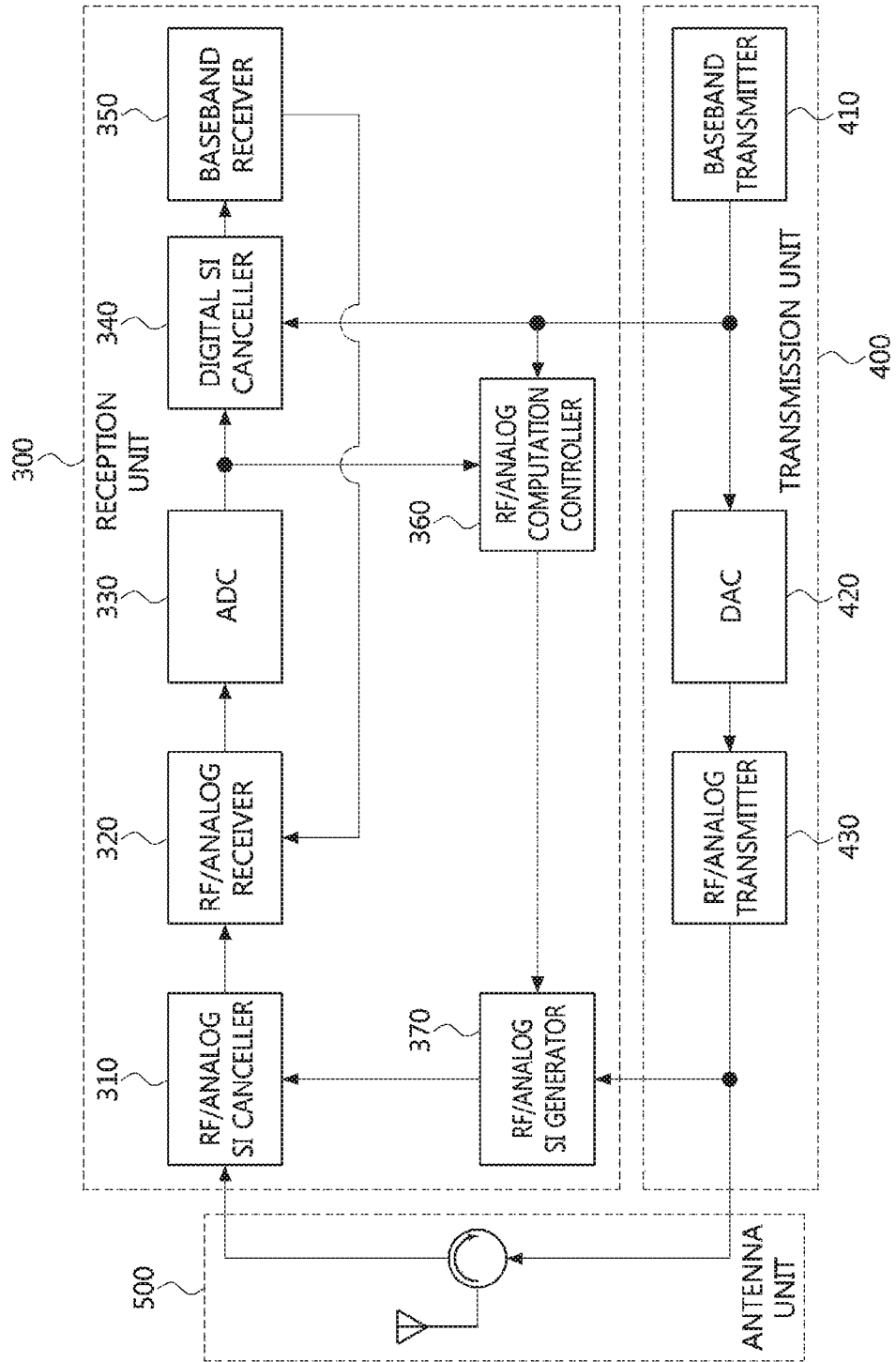
FIG. 4 is a block diagram showing an IFD transceiving device according to an embodiment of the present invention.

FIG. 4 is a block diagram showing an IFD transceiving device according to an embodiment of the present invention.

Referring to FIG. 4, an In-band Full Duplex transceiving device (hereinafter referred to as an "IFD transceiving device") according to an embodiment of the present invention may include an IFD reception unit 300, an IFD transmission unit 400, and a multi-antenna unit 500.

The multi-antenna unit 500 may be composed of a single antenna or a plurality of antennas, and each antenna is connected to the IFD reception unit 300 and the IFD transmission unit 400. Here, a separate antenna may be applied as the antenna(s) of the multi-antenna unit 500. Here, a shared antenna may be applied as the antenna(s) of the multi-antenna unit 500. The multi-antenna unit 500 may include a circulator device for performing signal separation between the IFD reception unit 300 and the IFD transmission unit 400.

The IFD transmission unit 400 may include a baseband transmitter 410, a digital-to-analog converter (DAC) 420, and an RF/analog transmitter 430.

The baseband transmitter 410 may include a TX oversampling unit, and the baseband transmitter 410 may oversample and output a transmission signal to a digital SI controller 340 and an RF/analog computation controller 360 of the IFD reception unit 300 and the DAC 420.

The DAC 420 may convert the output signal of the baseband transmitter 410 into a digital signal and output the digital signal to the RF/analog transmitter 430.

In order to transmit a signal received by the DAC 420 in the form of a radio frequency (RF) signal, the RF/analog transmitter 430 may up-convert the received signal, amplify the up-converted signal, and output the amplified signal to the antenna unit 500. Also, the output signal of the RF/analog transmitter 430 may be input to an RF/analog SI generator 370 of the IFD reception unit 300.

The IFD reception unit 300 may include an RF/analog SI canceller 310, an RF/analog receiver 320, an analog-to-digital converter (ADC) 330, a digital SI canceller (DSIC) 340, a baseband receiver 350, an RF/analog computation controller 360, and an RF/analog SI generator 370.

The RF/analog SI generator 370 may generate an analog SI signal (analog-generated SI (AGSI)), which is formed by distorting the received signal, through a finite impulse response (FIR) filter in an RF analog area and may output the generated analog SI signal to the RF/analog SI canceller 310. In this case, the RF/analog computation controller 360 may create factors of the FIR filter and supply the factor to the RF/analog SI generator 370.

The analog SI canceller 310 may receive an RF band signal from the multi-antenna unit 500 and may perform an analog SIC (ASIC) operation in which the analog SI signal is removed from the received RF band signal on the basis of the analog SI signal received from the RF/analog SI generator 370.

The RF/analog receiver 320 may receive a signal of an AGC device in the baseband receiver 350, adjust power of the received signal, down-convert the received signal into baseband (BB) or intermediate frequency (IF), and output the down-converted signal to the ADC 330.

The ADC 330 may convert an analog signal input by the RF/analog receiver 320 into a digital signal and output the digital signal.

The output signal of the ADC 330 may be output to the DSIC 340 and the RF/analog computation controller 360.

The DSIC 340 may receive the output signal of the ADC (340) and may perform a digital SIC (DSIC) operation in which digital-generated SI (DGSI) is canceled from the received signal. In this case, by using a signal output from the baseband transmitter 410 of the IFD transmission unit 400, the DSIC 340 may cancel the residual SI signals from the digital signal and then output the digital signal to the baseband receiver 350.

Figure 5:
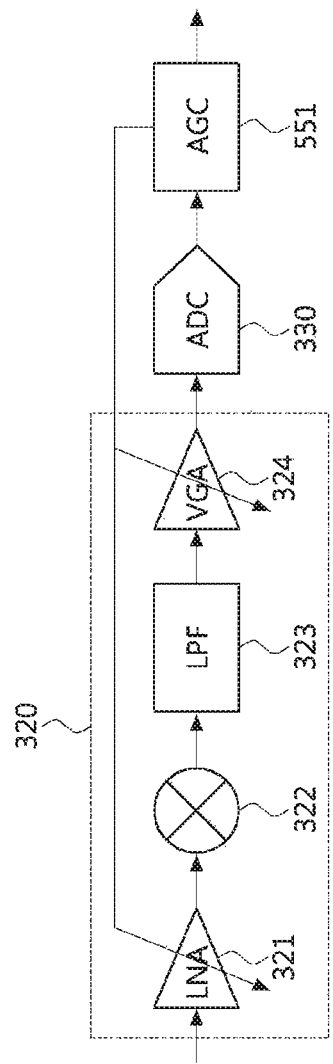
FIG. 5 is a block diagram showing an automatic gain controller included in a baseband receiver, an ADC, and an RF/analog receiver shown in FIG. 4.

The baseband receiver 350 may receive, from the DSIC 340, the signal on which the SIC has been performed and then may down-sample, decode, and output the signal. In this case, as shown in FIG. 5, the baseband receiver 350 includes an automatic gain controller (AGC) 551 in order to automatically adjust the gain of the output signal. In this way, by canceling an analog component of the SI signal through the RF/analog SI canceller 310 and canceling a digital component of the SI signal through the DSIC 340, the baseband receiver 350 may obtain a desired signal through digital demodulation.

FIG. 5 is a block diagram showing an AGC included in a baseband receiver, an ADC, and an RF/analog receiver shown in FIG. 4.

Referring to FIG. 5, the RF/analog receiver 320 includes a low-noise amplifier (LNA) 321, a frequency mixer 322, a low frequency pass filter (LPF) 323, and a variable gain amplifier (VGA) 324.

A signal received through the antenna unit 500 is very small and thus should be amplified before the signal is converted into a digital signal through the ADC 330. Accordingly, an RF signal is amplified through the LNA 321 and then converted into a baseband signal through the frequency mixer 322. In this case, the number of LNAs 321 is the same as the number of reception antennas of the multi-antenna unit 500, and each of the LNAs 321 is connected to a corresponding reception antenna so that the output of the reception antenna may be input to a corresponding LNA 321. Also, the frequency mixer 322 may down-convert the received RF signal into a baseband signal, and may output the down-converted RF signal to the LPF 323.

Subsequently, ambient frequency interference is canceled through the LPF 323, and then signal saturation in the ADC 330 is prevented through the VGA 324. Thus, it is possible to convert an analog signal into a signal capable of obtaining the maximum signal-to-noise ratio (SNR). The output signal of the ADC 330 may be input to the AGC 551, and the AGC 551 may automatically adjust the gain of the input signal and then output the signal.

Figure 6:
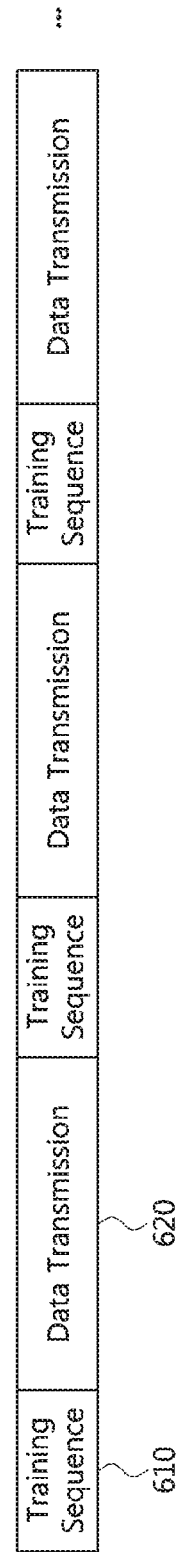
FIG. 6 shows an IFD frame sequence.

FIG. 6 shows an IFD frame sequence.

Referring to FIGS. 3 and 6, an IFD frame sequence 600 may be configured by alternating a training sequence period 610 (i.e., a first period) for transmitting a training sequence and a date transmission period 620 (i.e., a second period) for performing data transmission. In order to cancel SI signals in the IFD communication system, the RF/analog computation controller 360 and the RF/analog SI generator 370 need to estimate linear and non-linear distortion information of signals generated by the IFD transmission unit 400 and the antenna unit 500. In order to estimate the linear and non-linear distortion of signals, a training sequence, which is known signal, may be transmitted before data transmission.

Here, the training sequence may include a first training sequence, which is needed for RF/analog SI cancellation, and a second training sequence, which is needed for digital SI cancellation. The configurations of the first training sequence and the second training sequence may be variously designed. For example, when the RF/analog SI cancellation is performed in two or more stages, two or more first training sequences may be needed. Even in the digital SI cancellation, the number of antennas may increase, or the number of sequences for sequential digital SI cancellation may vary.

Figure 7:
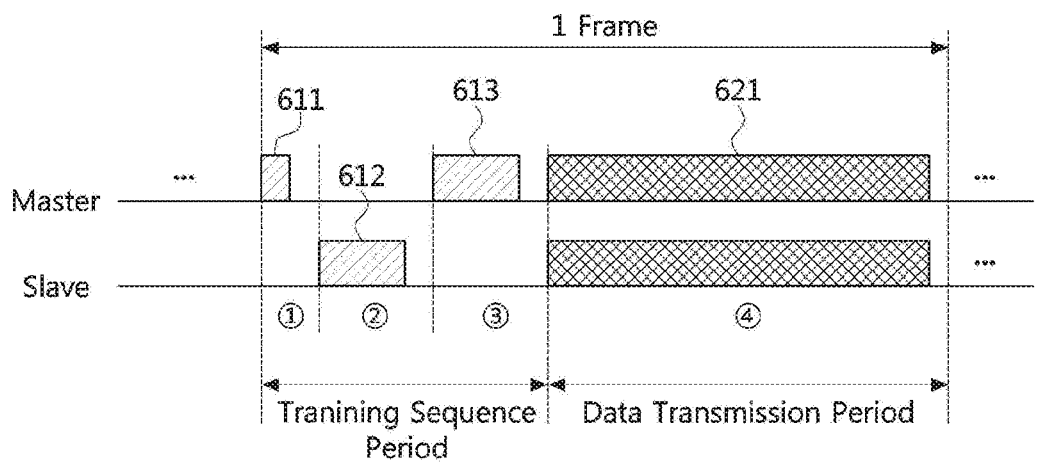
FIG. 7 shows an IFD frame structure.

FIG. 7 shows an IFD frame structure.

Referring to FIGS. 3 and 7, one frame may consist of a training sequence period (①, ②, ③) and a data transmission period (④) for transmitting data 621. Here, a frame may represent a group of one or more training sequence periods and one or more data transmission periods. The term "frame" is not mapped to a frame of a mobile terminal structure such as LTE or a packet frame of a wireless LAN system, but may be defined as a group of information needed for IFD transmission, training sequences, and data.

A master node may be a base station in mobile communication network structure communication, an access point (AP) of a communication network structure such as a wireless LAN, a host having a connection initiative in a point-to-point communication structure, or the like. A slave node may be a terminal system connected to a base station to have a transmission token, a station (STA) connected to an AP of a wireless LAN to have channel access authority, a device connected to a host for one-to-one communication, or the like.

In addition to an operation of calculating filter factors of the RF/analog canceller 310 and the DSIC 340 needed for SI cancellation through the training sequence, the slave node may perform the following operations: (1) Synchronization for performing transmission and reception in the data transmission period at the same time may be performed; (2) Since antenna radiation occurs during transmission of a training sequence, a counter IFD system to perform IFD communication may limit transmission during this period; and (3) by adjusting gain of RF/analog using a training sequence to change input magnitude of the ADC 330, it is possible to ensure the maximum SNR that can be demodulated in the baseband receiver 350.

To this end, according to the present invention, a beacon signal 611 may be placed in each IFD frame period to enable the synchronization. Also, by temporally separately transmitting a slave training sequence 612 and a master training sequence 613, it is possible to avoid interference therebetween. Like this, the beacon signal 611, the slave training sequence 612, and the master training sequence 613 may be combined to generate a training sequence structure such that gain adjustment can be performed in the AGC 551.

The training sequence period may consist of a beacon signal period (①) for transmitting the beacon signal 611, a slave sequence period (②) for transmitting the slave training sequence 612, and a master sequence period (③) for transmitting the master training sequence 613.

The beacon signal 611, which is a signal transmitted by the master node to the slave node, may be used for synchronization between the master node and the slave node and may transmit IFD-associated information to the slave node through the beacon signal 611. When the beacon signal 611 is received, the slave node may measure the magnitude of the transmission signal of the master node through the beacon signal 611.

Each of the master node and the slave node may measure its own interference signal, calculate a filter value needed for SI cancellation, and generate an SI training sequence. The slave node may generate and transmit the slave training sequence 612 to the master node, and the master node may generate and transmit the master training sequence 613 to the slave node.

The slave node may measure the magnitude of the master signal during the beacon signal period (①). The master node may receive a slave training sequence during the slave training sequence period (②), measure the magnitude of signals, and then find the magnitude of a signal desired to be received.

Each of the master node and the slave node may first cancel SI in the RF/Analog stage during the AGC sequence period of the training sequence periods (②, ③). Then, each of the master node and the slave node may measure the magnitude of the residual SI signals and find a gain adjustment value needed for gain adjustment of the AGC 551 using the found magnitude of the signal desired to be received and the magnitude of the residual SI signals.

In the data transmission period (④), each of the master node and the slave node may reflect the gain adjustment value calculated during the training sequence period, remove the SI signals by means of a self-interference cancellation filter, and demodulate the received signal.

Figure 8:
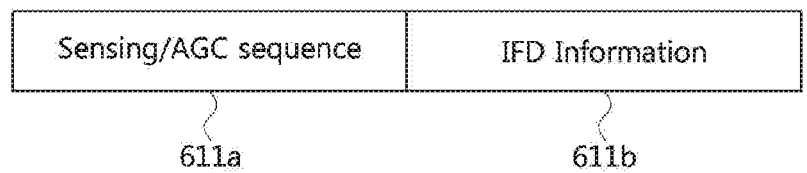
FIG. 8 is a block diagram showing a configuration of a beacon signal included in an IFD frame.

FIG. 8 shows a configuration of a beacon signal included in an IFD frame.

Referring to FIG. 8, the beacon signal 611 may be transmitted by the master node to the slave node before entrance into an IFD SI training operation period. The beacon signal 611 may be composed of a sensing/AGC sequence field 611a for performing signal sensing and gain adjustment and an IFD information field 611b including information associated with an IFD operation.

The sensing/AGC sequence field 611a may be used by the slave node that has received the beacon signal 611 to sense the presence of an IFD signal, perform timing synchronization between the master node and the slave node, and measure the magnitude of a signal transmitted by the master node to the slave node. The IFD information field 611b may be transmitted by the master node to the slave node in order to deliver necessary signal information during the IFD period.

As an example of the beacon signal 611 transmitted by the master node to the slave node, when an OFDM communication system is assumed, time domain may be expressed as the following Equation 1:

$$s(t) = \text{Re}\left\{ e^{j2\pi f_c t} \sum_{k=-N_{FFT}/2}^{(N_{FFT}/2)-1} a_k e^{j2\pi k(t-T_g)/T_u} \right\} \quad \text{[Equation 1]}$$

where $f_c$ may be a carrier frequency, k may be a subcarrier index, t may be a time, $a_k$ may be a complex modulated signal transmitted at the subcarrier index k, $N_{FFT}$ may be the total number of subcarriers, T may be a cycle of an OFDM symbol, $T_u$ may be an OFDM effective symbol length, and $T_g$ may be a guard time.

T in Equation 1 may be expressed as the following Equation 2:

$$T = T_g + T_u \quad \text{[Equation 2]}$$

Accordingly, the configuration of the beacon signal 611 may be expressed as the following Equation 3:

$$s_{BEACON}(t) = s_{SEN}(t) + s_{INFO}(t - t_{INFO}) \quad \text{[Equation 3]}$$

where $S_{BEACON}$ may be a time domain value of the beacon signal, $S_{SEN}$ may be a time domain value of the sensing/AGC sequence period of the beacon signal, $S_{INFO}$ may be a time domain value of the IFD information period of the beacon signal, and $t_{INFO}$ may be a start time of the IFD information period.

A signal for sensing/AGC sequence ($S_{SEN}$) 611a of the beacon signal may have a form in which the same signal is repeated for a short time. As an example, a method of applying a short training symbol of the wireless LAN to $a_k$ of Equation 1 and then repeating the signal may be used as the following Equation 4:

$$a_k = (0,0, \ldots 0,0,0,0,1+j,0,0,0,-1-j,0,0,0,1+j,0,0,0,-1-j,0,0,0,-1-j,0,0,0,1+j,0,0,0,0 \ 0,0,0,-1-j,0,0, \ 0,-1-j,0,0,0,1+j,0,0,0,1+j,0,0,0,1+j,0,0,0,1+j,0,0, \ 0,0, \ldots, 0,0) \quad \text{[Equation 4]}$$

By utilizing such a signal, it is possible to sense a signal by using cross-correlation property or auto-correlation property of symbols repeated during a beacon period in the time axis and also possible to perform signal magnitude measurement and gain adjustment during the repetition period.

The IDF information ($S_{INFO}$) field 611b of the beacon signal 611 may be used to carry data information over a sub-carrier except a guard sub-carrier part. In this case, data may be allocated to several OFDM symbols, as expressed in the following Equation 5:

$$a_k = (0,0, \ldots 0,0, \text{DATA subcarriers}, 0,0, \ldots, 0,0) \quad \text{[Equation 5]}$$

A training period needed for data demodulation may be included in a data sub-carrier part. Information to be transmitted may include physical layer information (information necessary for a slave node to analyze a signal received from a master node, e.g., information related to the number of antennas/modulation scheme, etc.) of the master node, a slave ID connectable to a master IFD system (information used by a slave node that has received a beacon to identify a master node to be connected to the slave node), IFD training symbol information (basic information necessary for a slave node to transmit and analyze a training signal, e.g., the lengths and types of an RF/analog SI training sequence, an AGC sequence, and a digital SI training sequence, etc.), an IFD frame length (information necessary for preparing the size of data to be transmitted by the slave node in advance), an IFD frame sequence number (information for checking data loss or transmission error by delivering quantity of IFD frames existent prior to an IFD frame being currently received by a slave node), and the like.

Figure 9:
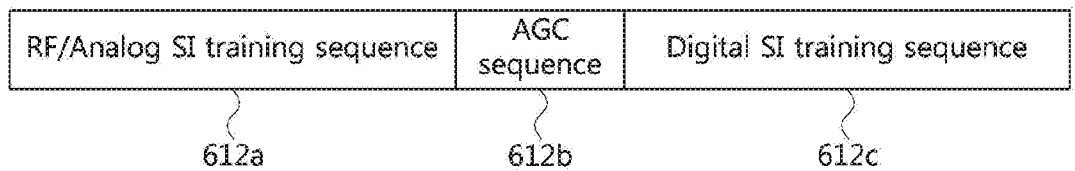
FIG. 9 is a block diagram showing a master/slave SI training sequence included in an IFD frame.

FIG. 9 shows a master/slave SI training sequence included in an IFD frame.

Referring to FIG. 9, the slave SI training sequence period 612 of the IFD frame structure may include an RF/analog SI training sequence 612a, an AGC sequence 612b, and a digital SI training sequence 612c. The master node as well as the slave node may use the SI training sequence period 612 shown in FIG. 9.

The RF/analog SI training sequence 612a of the slave SI training sequence period 612 may include a sequence used by the RF/analog computation controller 360 of FIG. 3 to compute a filter factor of the RF/analog SI generator 370.

Also, the AGC sequence 612b may include a sequence for measuring the magnitude of the SI signal and controlling the gains of an LNA and a VGA after the SI signal is canceled by the RF/analog SI canceller 310. Also, the digital SI training sequence 612c may include a sequence for computing a factor of the digital SI filter needed for the DSIC 340 to cancel the residual SI.

In detail, while the RF/analog SI training sequence 612a is being transmitted, the DSIC 340 may calculate a filter factor value for canceling RF/analog SI by using an SI signal input at the reception end of the slave node. Subsequently, the calculated filter factor value may be updated. Subsequently, the SI may be canceled using the AGC sequence 612b that has passed through the RF/analog SI cancellation filter during a period for the AGC sequence 612b, and then the magnitude of the residual SI may be measured. In this case, a third magnitude value may be calculated by adding a first magnitude value of a desired signal (DS) measured through reception of a beacon signal and a second magnitude value of the residual SI. Also, the gains of the LNA and the VGA may be adjusted on the basis of the third magnitude value such that a signal having an appropriate magnitude value within a dynamic range of the ADC 330 can be input. After the adjustment of the gains of the LNA and the VGA, a digital SI cancellation filter factor may be computed using the residual SI signal input to the ADC 330 placed at a reception end of the slave node during transmission of the digital SI training sequence 612c.

In order to improve the method of continuously transmitting SI training sequences such as an RF/analog SI training sequence and a digital SI training sequence during the training sequence period (a first period) 610 as shown in FIG. 6, the AGC sequence 612b for gain adjustment is placed between the RF/analog SI training sequence 612a and the digital SI training sequence 612c, as shown in FIG. 9. Thus, it is possible to perform signal magnitude adjustment for the maximum SNR before a received signal is input to the ADC 330 of FIG. 3.

An example of the slave SI training sequence may be expressed as the following Equation 8, and this may be applied to the master SI training sequence.

$$s_{T\_SEQ}(t) = s_{RSI}(t) + s_{AGC}(t - t_{AGC}) + s_{DSI}(t - t_{DSI}) \quad [\text{Equation 6}]$$

where $S_{T\_SEQ}$ may be a time domain value of an SI training sequence, $S_{RSI}$ may be a time domain value of an RF/analog SI training sequence period of the SI training sequence, $S_{AGC}$ may be a time domain value of an AGC sequence period of the SI training sequence, and $S_{DSI}$ may be a time domain value of a digital SI training sequence period of the SI training sequence. Also, $t_{AGC}$ may be a start point of the AGC sequence period, and $t_{DSI}$ may be a start point of the digital SI sequence period.

As an example of the RF/analog SI training sequence, a Zadoff-Chu (ZC) sequence among constant amplitude zero auto-correlation sequences, which are frequency-orthogonal sequences, may be used.

When the length of the ZC sequence is N and a root index is M, the $k^{th}$ element of the root ZC sequence may be expressed as the following Equation 7.

$$c(k) = e^{-j\pi Mk(k+1)/N}, \text{ for } N \text{ odd}$$

$$c(k) = e^{-j\pi Mk^2/N}, \text{ for } N \text{ even} \quad [\text{Equation 7}]$$

When the $k^{th}$ element is allocated to sub-carrier $a_k$ of the expression $S_{RSI}(t)$, the following Equation 8 may be obtained.

$$a_k = (0, 0, \ldots 0, 0, c(0), c(1), c(2), \ldots c(N-4), c(N-3), c(N-2), 0, 0, \ldots, 0, 0) \quad [\text{Equation 8}]$$

The example of the AGC sequence may be applied to the sensing/AGC sequence 611a of the beacon signal of FIG. 8, as shown in Equation 9, and the signal length may be adjusted depending on the number of AGCs required or the like.

$$s_{AGC}(t) = s_{SEN}(t) \quad [\text{Equation 9}]$$

As an example of the digital SI training sequence, a Gaussian random sequence having a frequency bandwidth used in the time domain may be generated and used, or a specific signal may be generated and used in the frequency domain as expressed in the following Equation 10. The signal of Equation 10 may be generated in consideration of a long training symbol of a wireless LAN.

$$a_k = (0, 0, \ldots 0, 0, 1, 1, -1, -1, 1, 1, -1, 1, -1, 1, 1, 1, 1, 1, 1, -\\ 1, -1, 1, 1, -1, 1, -1, 1, 1, 1, 0 \ 1, -1, -1, 1, 1, -1, 1, -1, 1, -\\ 1, -1, -1, -1, -1, 1, 1, -1, -1, 1, -1, 1, -1, 1, 1, 1, 1, 1, 0, 0, \ldots\\ ., 0, 0). \quad [\text{Equation 10}]$$

Figure 10:
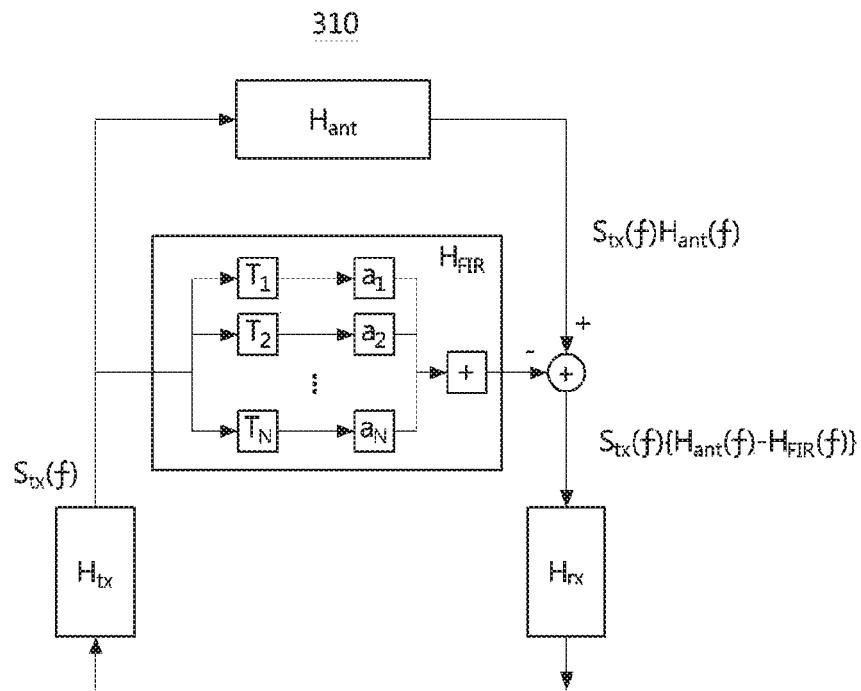
FIG. 10 is a block diagram showing a first embodiment of an IFD transceiving device.

FIG. 10 shows a first embodiment of an IFD transceiving device.

Referring to FIG. 10, while the slave node transmits an RF/analog SI training signal, the RF/analog computation controller 360 of FIG. 4 may compute and update a filter factor of the RF/analog SI canceller 310 of the slave node. For example, as shown in FIG. 10, leakage SI and antenna reflection SI, which may occur through the antenna unit 500, may be canceled by designing the RF/analog transceiver as shown in FIG. 10.

In FIG. 10, $H_{tx}$ may be a transfer function of the transmission unit 400, $H_{rx}$ may be a transfer function of the reception unit 300, $H_{ant}$ may be an antenna transfer function, $H_{FIR}$ may be a transfer function of the RF/analog SI cancellation filter, and $S_{tx}(f)$ may be a transmission signal frequency domain function.

The transfer function of the RF/analog SI cancellation filter may be expressed as the following Equation 11:

$$H_{FIR}(f) = \sum_{n=0}^{N-1} a_n e^{-j2\pi f T_n}, \; T_n = nT \quad [\text{Equation 11}]$$

where N may be the number of taps of the filter, $T_n$ may be a delay time for each Tap, and $a_n$ may be a filter factor of each Tap.

When Equation 11 is expressed as a matrix with reference to N frequencies, the following Equation 12 may be obtained.

$$H_{FIR} = Fa \begin{bmatrix} H_{FIR}(f_0) \\ H_{FIR}(f_1) \\ \vdots \\ H_{FIR}(f_{N-1}) \end{bmatrix} = \begin{bmatrix} e^{-j2\pi f_0 T_0} & e^{-j2\pi f_0 T_1} & \cdots & e^{-j2\pi f_0 T_{N-1}} \\ e^{-j2\pi f_1 T_0} & e^{-j2\pi f_1 T_1} & \cdots & e^{-j2\pi f_1 T_{N-1}} \\ \vdots & \vdots & \vdots & \vdots \\ e^{-j2\pi f_{N-1} T_0} & e^{-j2\pi f_{N-1} T_1} & \cdots & e^{-j2\pi f_{N-1} T_{N-1}} \end{bmatrix} \begin{bmatrix} a_0 \\ a_2 \\ \vdots \\ a_{N-1} \end{bmatrix}$$

[Equation 12]

where $H_{FIR}$ may be an RF/analog SI cancellation filter transfer function frequency vector, F is an RF/analog SI cancellation filter frequency, and a time delay matrix a may be an RF/analog SI cancellation filter factor.

The calculation of the filter factor by using Equation 12 may be achieved by finding a value $a_{opt}$ using a least-squares method and applying the value to the filter.

$$H_{ant} = H_{FIR} + e$$
$$a_{opt} = \arg\min_a \|H_{ant} - Fa\|$$

[Equation 13]

where $H_{ant}$ may be an antenna transfer function frequency vector, e may be a difference between the antenna transfer function frequency vector and a frequency vector of the RF/analog SI cancellation filter transfer function, and an error vector $a_{opt}$ may be an optimal RF/analog SI cancellation filter factor vector.

From the signal for the AGC sequence 612b, a signal from which some SI has been canceled may be input to the RF/analog receiver of the slave IFD system. By using the strength of the SI signal of the AGC sequence 612b and the strength of a signal of the master node measured through reception of the beacon signal 611, the gains of the LNA 321 and the VGA 324, which are shown in FIG. 5, may be adjusted to perform control such that a desired signal (DS) is input to the ADC 330.

During the period of the digital SI training sequence 612c next to the AGC sequence 612b, a digital SI filter factor may be computed and updated from a digitally-converted value by reflecting a gain value adjusted during the period of the AGC sequence 612b.

For example, when a received digital sampling baseband signal is expressed using a Volterra model (y) as shown in the following Equation 14, a transmission baseband value x of a training signal is known, and thus a Volterra kernel may be estimated using a transmission signal x, bases of x, and reception y and then applied to the digital SI cancellation filter.

$$y[n] = \sum_{k=1}^{K} \sum_{m_i=0}^{M-1} \cdots \sum_{m_{2k-1}=0}^{M-1} h_{2k-1}[m_1, \ldots, m_{2k-1}]$$

[Equation 14]

-continued $$\prod_{i=1}^{k} x[n - m_i] \prod_{i=k+1}^{2k-1} x^*[n - m_i]$$

where x may be a digital sampling transmission baseband signal, y may be a digital sampling reception baseband signal, $h_{2k-1}[m_1, \ldots, m_{2k-1}]$ may be a Volterra kernel, P=2K−1 may be a non-linear order, and M may be a memory length.

As shown in FIG. 7, during the slave training sequence period (②), the master node may receive a signal radiated through the antenna of the slave node, measure the magnitude of the slave sequence signal, and store the magnitude in the memory.

During the SI training sequence period (③), the master node may transmit the training signal of FIG. 9 to the slave node, as in during the slave SI training sequence period, and may perform the same task as that performed by the slave node.

That is, while the master node transmits an RF/analog SI training signal of the SI training sequence period, the RF/analog computation controller 360 of the master node of FIG. 4 may compute and update a factor of the RF/analog SI filter of the mater node. Also, during the AGC sequence of the master SI training sequence period (③), a signal from which some SI has been canceled is input to the RF/analog receiver 320 of the master IFD system. Accordingly, the master node may adjust the gains of the LNA 321 and the VGA 324, which are shown in FIG. 5, using the strength of the SI signal of the AGC sequence 612b shown in FIG. 9 and the strength of a signal of the slave node measured through reception of the slave training sequence to perform control such that a signal having desired strength is input to the ADC 330. Also, during the period of the subsequent digital SI training sequence 612c, the DSIC 340 of the master node shown in FIG. 3 may compute and update a digital SI filter factor in consideration of a gain adjustment value.

In detail, an SI signal for the training sequence may be simultaneously received at a reception end of the master node along with the transmission of a second SI training sequence. Subsequently, while the RF/analog SI training sequence is being transmitted, a filter factor value for canceling RF/analog SI may be calculated by using an SI signal input at the reception end of the master node. Then, the calculated filter factor value may be updated.

Also, during the AGC sequence, the magnitude of the residual SI may be measured on the basis of the AGC sequence that has passed through the RF/analog SI cancellation filter. In this case, a third magnitude value may be calculated by adding a first magnitude value of a desired signal (DS) measured through a first SI training sequence and a second magnitude value of the residual SI. Also, the gains of the LNA and the VGA may be adjusted on the basis of the third magnitude value such that a signal having an appropriate magnitude can be input to the ADC 330. After the adjustment of the gains of the LNA and the VGA, a digital SI cancellation filter factor may be computed using the residual SI signal input to the ADC 330 placed at the reception end of the mater node during transmission of the digital SI training sequence.

During the data transmission period (④) in which the data 621 shown in FIG. 7 is transmitted, the master node and the slave node may simultaneously perform transmission and reception of data. In particular, while the master node and the slave node receive the data, the RF/analog SI canceller 310 may partially cancel the SI signal by applying the SI cancellation filter factor computed during the training signal period to the RF/analog SI cancellation operation. Also, while the AGC 551 applies gain values of the LNA 321 and the VGA 324, the DSIC 340 may receive a digital signal and remove the residual SI signal. Subsequently, the signal may be demodulated through the baseband receiver 350. In this way, the slave node and the master node may update the RF/analog SI cancellation filter factor and the digital SI cancellation filter factor and then may cancel the SI signal during the data transmission period and also demodulate a desired signal.

Figure 11:
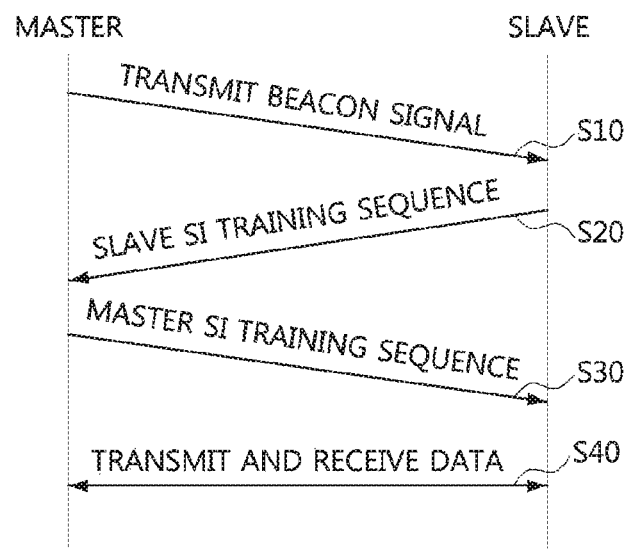
FIG. 11 is a flowchart showing an operating method for an IFD communication system.

FIG. 11 is a flowchart showing an operating method for an IFD communication system. The operations of the master node and the slave node for the periods described with reference to FIGS. 6 to 10 will be described with reference to FIG. 11.

Referring to FIG. 11, the master node may transmit a beacon signal to the slave node in order to enter IFD communication (S10).

When the beacon signal is received, the slave node may sense the beacon signal to perform timing synchronization, measure the magnitude of the signal transmitted by the master node, and then store a result of the measurement in a memory. Also, the slave node may check IFD information received together with the beacon signal and prepare for IFD transmission and reception.

A conventional IFD system uses only a self-training signal for the purpose of SI cancellation, but according to the present invention, it is possible to pre-check signal strength of the master node using a beacon signal and perform gain adjustment in consideration of a signal (DS) desired by the slave node.

Subsequently, when the reception of the beacon signal is completed, the slave node may generate an SI training sequence and then transmit the generated SI training sequence to the master node (S20). In this case, the slave node may compute and apply a factor of an RF/analog SI cancellation filter and may perform gain adjustment using the magnitude of a signal from which some SI is removed and the magnitude of the transmission signal of the master node, which is checked using the beacon signal. Subsequently, the slave node computes a digital SI cancellation filter factor.

When the SI training signal of the slave node is received, the master node may measure the magnitude of the received signal and store a result of the measurement in the memory.

Subsequently, the master node may generate an SI training sequence and transmit the generated SI training sequence to the slave node (S30). In this case, the master node may compute and apply a factor of an RF/analog SI cancellation filter and may perform gain adjustment using the magnitude of a signal from which some SI is removed and the magnitude of the transmission signal of the slave node, which is checked through reception of the slave SI training sequence. Also, the master node may compute the digital SI cancellation filter factor.

Subsequently, when the SI cancellation filter computation of the master node and the slave node is completed, data may be transmitted and received between the master node and the slave node while the SI cancellation filter and gain adjustment values are applied (S40).

The gain adjustment process of the master node and the slave node is performed for the following reasons.

First, a signal input to the ADC during the data transmission period is obtained by adding a signal received from a counter IFD system to an SI signal from which only RF/analog SI cancellation is performed. It is possible to perform accurate gain adjustment only when the magnitude of the SI signal and the magnitude of the desired signal (DS) are known. Accordingly, the slave node may check the beacon signal transmitted by the master node and the magnitudes of the two signals during the slave SI training period, and the master node may check the magnitudes of the two signals during the slave SI training period and the master SI training period.

Second, it is possible to perform gain adjustment at any time of the master/slave SI training period or after the SI training period. In this case, it may be difficult to reflect the contents computed by the SI training sequence due to changes in magnitude and phase of the signal caused by gain adjustment for the LNA/VGA or the like. Thus, the signal generation required for RF/analog SI cancellation from a fixed gain value may be completed. Subsequently, the digital SI cancellation may be performed by adjusting the gain of the LNA/VGA.

Figure 12:
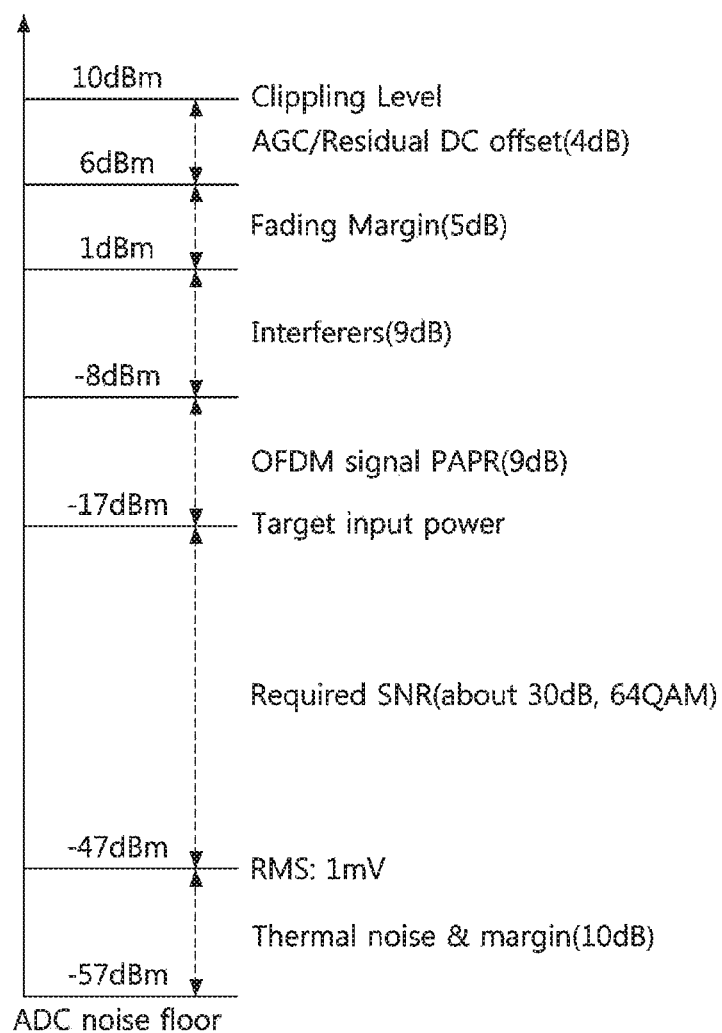
FIG. 12 is a conceptual view showing a dynamic range of a reception end ADC included in an IFD transceiving device.

FIG. 12 is a conceptual view showing a dynamic range of a reception end ADC included in an IFD transceiving device.

Referring to FIG. 12, in a system in which the clipping level of the ADC input is 10 dBm and the effective number of bits (ENOB) is about 11.1 bits, an ADC dynamic range of an orthogonal frequency division multiplexing (OFDM) system requiring an SNR of 30 dB may be defined as shown in FIG. 12. In a half-duplex system, an ADC input signal should be adjusted to a magnitude capable of securing the maximum SNR at −17 dBm or more through RF/analog gain control.

The following three cases may be considered to adjust the gain of the ADC input signal. The gain may be adjusted in case (1) in which the desired signal (DS) is stronger than the SI signal, case (2) in which the desired signal (DS) has the same strength as the SI signal, and case (3) in which the desired signal (DS) is weaker than the SI signal.

Figure 13:
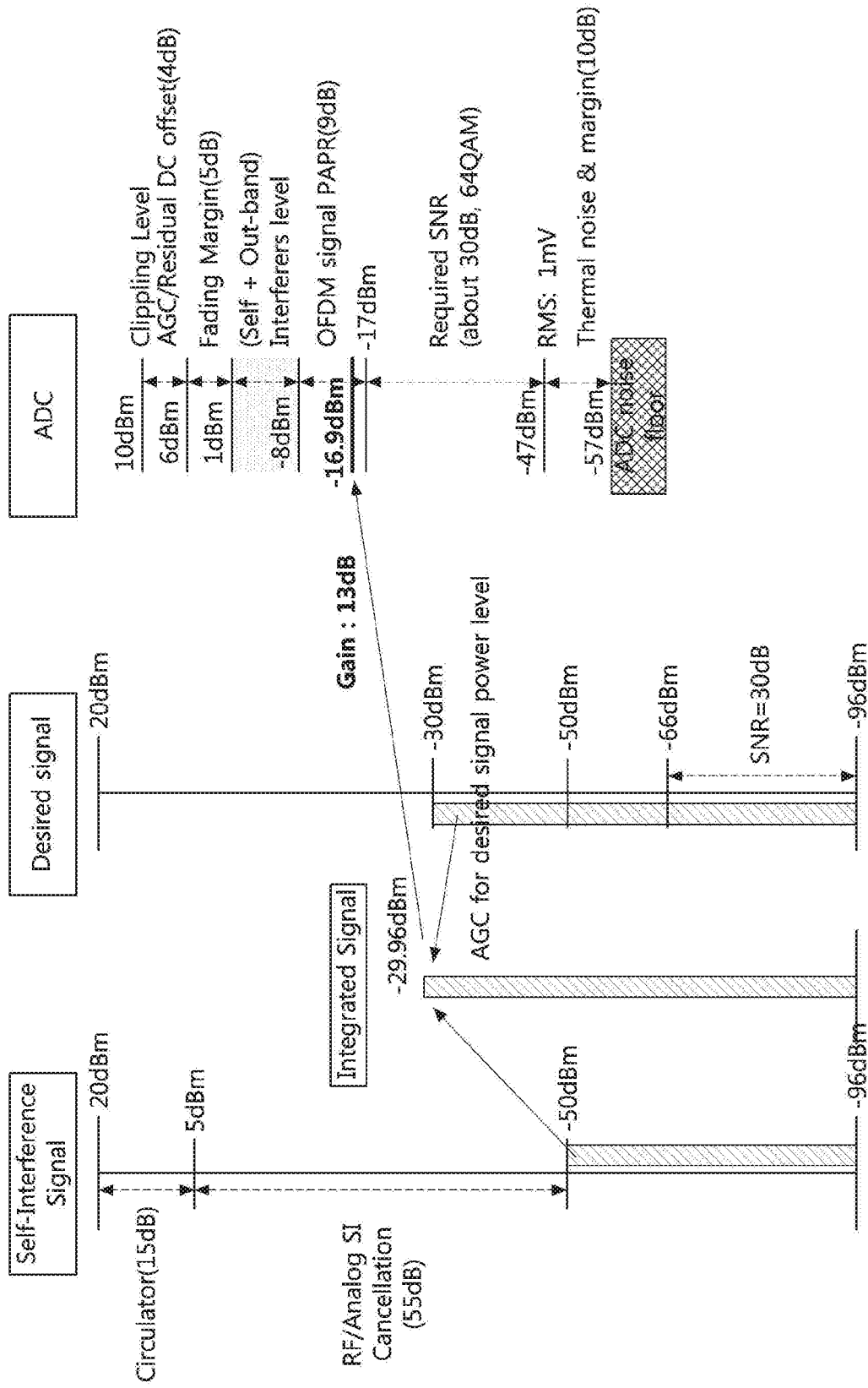
FIG. 13 is a conceptual view showing a method of adjusting gain when a desired signal (DS) is stronger than a self-interference (SI) signal.

FIG. 13 is a conceptual view showing a method of adjusting gain when a desired signal (DS) is stronger than an SI signal.

Referring to FIG. 13, in a system in which the magnitude of a noise signal is −96 dBm, it may be assumed that the magnitude of a transmitted signal is 20 dBm. In this case, when the SI is reduced by 15 dBm through a circulator of an antenna unit and then reduced by 55 dB through RF/analog cancellation, the magnitude of the signal may be −50 dBm. In this case, when the magnitude of an RF/analog receiver input signal of a desired signal (DS) input by a counter system, the magnitude of a signal combined with the SI signal may be slightly about −30 dBm. Therefore, the gain adjustment may be performed by setting a target to a higher magnitude than that of the half-duplex system. As shown in FIG. 13, the target may be set to −16.9 dBm, and the gain adjustment for the LNA/VGA may need 13 dB.

Figure 14:
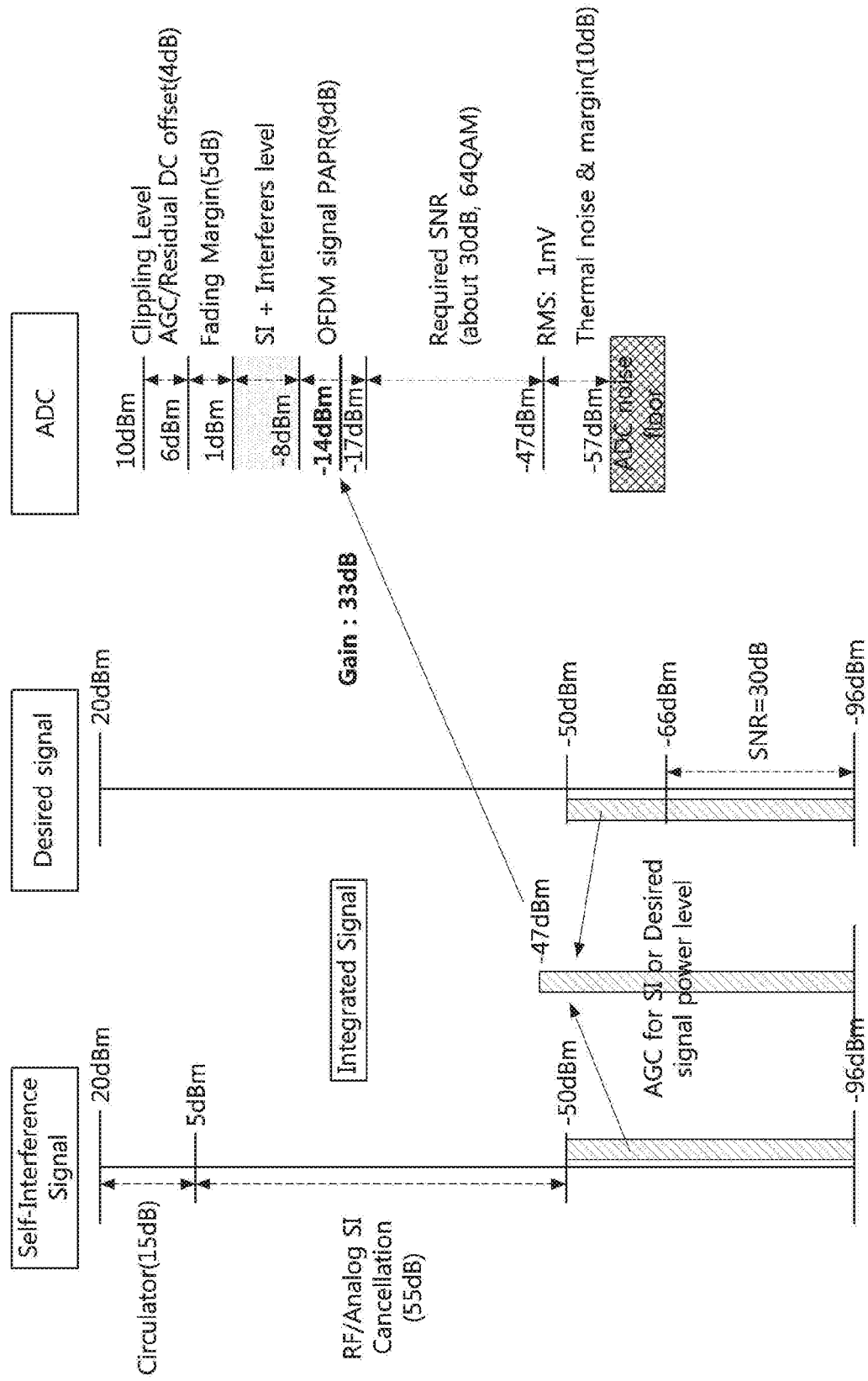
FIG. 14 is a conceptual view showing a method of adjusting gain when a desired signal (DS) is the same as a self-interference (SI) signal.

FIG. 14 is a conceptual view showing a method of adjusting gain when a desired signal (DS) is the same as a self-interference (SI) signal.

Referring to FIG. 14, when the desired signal (DS) entered from the counter system is −50 dBm, which is equal to the residual SI remaining after the RF/analog SI cancellation, under the same conditions as those described with reference to FIG. 13, an expected magnitude of a signal obtained by adding the SI signal and the desired signal (DS) may be −47 dBm. Accordingly, the RF/analog gain adjustment may need 33 dB, about 3 dB may be used when SI is added to an Interferer level in a dynamic range for the ADC input, and the ADC target may be set to −14 dBm or more.

Thus, it is possible to obtain the SNR needed to demodulate a signal at an IFD reception end.

Figure 15:
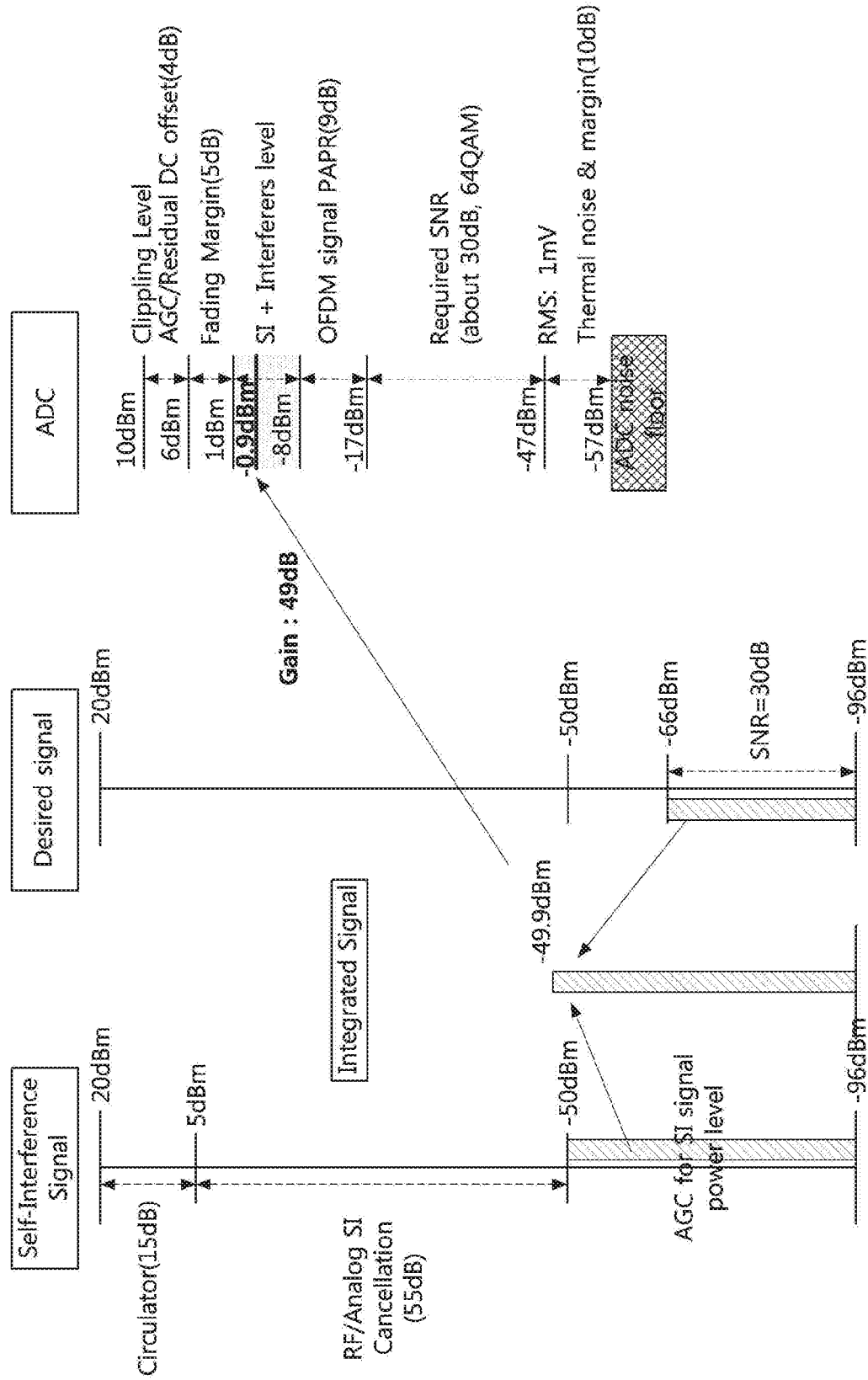
FIG. 15 is a conceptual view showing a method of adjusting gain when a desired signal (DS) is weaker than a self-interference (SI) signal.

FIG. 15 is a conceptual view showing a method of adjusting gain when a desired signal (DS) is weaker than a self-interference (SI) signal.

Referring to FIG. 15, when the desired signal (DS) entered from the counter system is −66 dBm, which is significantly smaller than the residual SI remaining after the RF/analog SI cancellation, under the same conditions as those described with reference to FIG. 13, an expected magnitude of a signal obtained by adding the SI signal and the desired signal (DS) may be −49.9 dBm. Accordingly, the RF/analog gain adjustment may need 49 dB. In such an environment, the SI signal input to the ADC is significantly strong, and thus the input should be a strong signal over 17 dB exceeding the SNR range required for the demodulation. However, the actual desired signal (DS) maintain the magnitude smaller than the ADC input SI even when OFDM Peak-to-Average Power Ratio (PAPR), Fading, and the like are reflected, and thus data loss caused by saturation of the ADC does not occur.

When the difference between the residual SI signal remaining after the RF/analog SI cancellation and the desired signal (DS) is so large that there is no margin for the dynamic range of the ADC, the ADC input target may be limited to a specific signal to enable the gain control. In this case, it is difficult to obtain the SNR for the data signal, but demodulation is possible for control signals, and also adjustment of a modulation scheme for a data signal may be performed using this information in the next frame.

Measurement of the magnitude of the signal required for the gain adjustment operation described with reference to FIGS. 12 to 15 may be performed as follows.

Depending on the implementation, the signal strength may be measured in various ways. As an example, the signal strength may be calculated by placing an analog received signal strength indicator (RSSI) for directly measuring the signal strength at an RF reception end, at an intermediate stage inside the reception end, or the like. As another example, the signal strength may be calculated from the gain value of the RF stage and a value computed at the digital reception stage.

When the signal is measured using another example, the magnitude $P_{md}$ of the signal obtained by accumulating sampled signals i(n) and q(n) for one cycle or a half cycle in which a sequence is repeated may be expressed as the following Equation 15:

$$p_{ma} = S \cdot \sum_{n=0}^{N-1} (i^2(n) + q^2(n)) \qquad \text{[Equation 15]}$$

where i(n) and q(n) may be ADC output sampling in-phase/quadrature signals, N may be the number of samples in one cycle or a half cycle of the repeated sequence, and S may be a normalization factor according to the number of samples.

By using a gain control value of the RF/analog stage from the strength of a signal measured in a digital baseband, the strength P of an antenna input signal may be inferred on dB scale, as shown in the following Equation 16:

$$P = P_{ref} + 10 \cdot \log(p_{md}) + G_{LNA} + G_{VGA} \qquad \text{[Equation 16]}$$

where $P_{ref}$ may be the magnitude (dBm) of a reference signal and may be obtained through measurement in the system. Also, $G_{LNA}$ may be LNA gain, and $G_{VGA}$ may be VGA gain.

When the signal is saturated during the accumulation process, the LNA/VGA gain may be reduced a specific step. Also, when the ADC output value is too low, the LNA/VGA gain may be reduced to a lower step. At this time, the signal strength at which the maximum SNR can be obtained at the ADC output may be target signal power (PT).

Figure 16:
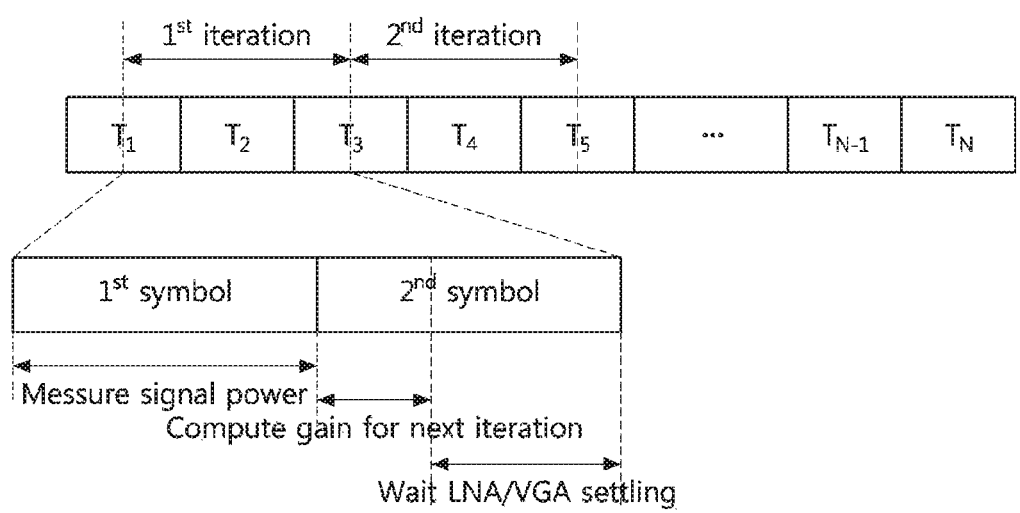
FIG. 16 is a conceptual view showing a method of adjusting gain of a sequence in which signals are periodically repeated.

FIG. 16 is a conceptual view showing a method of adjusting gain of a sequence in which signals are periodically repeated.

FIG. 16 shows an AGC sequence of an SI training sequence or a sensing/AGC sequence of a beacon signal and also shows a gain adjustment process for a sequence in which a periodic signal is repeated N times. $T_n$ may be a symbol repeated in the sensing/AGC sequence, and $1^{st}$ iteration and $2^{nd}$ iteration may be periods in which gain adjustment is performed once. In FIG. 16, for example, one iteration period is shown as including two $T_n$ symbols.

A reception unit may calculate $P_{md}$ in a signal strength measurement (measurement signal power) period during one iteration period. Also, a gain value needed for LNA/VGA adjustment may be calculated by computing the strength P of the antenna input signal during gain computation for next iteration. Subsequently, update may be performed using a new LAN/VGA value. During the LNA/VGA settling standby period, the method may wait until the signal is stabilized to the changed LNA/VGA value and then entered. That is, a receiver may repeatedly perform a process of measuring a signal for a certain cycle, performing computation needed for gain adjustment, adjusting the LNA/VGA gain, and waiting until the signal is stabilized.

The gain adjustment process of the slave node and the master node using the method of FIG. 16 is as follows.

The slave node measures the magnitude $P_D$ of the desired signal (DS) while receiving a beacon signal through the method described with reference to FIGS. 7 to 15. Also, the slave node may cancel SI using a value computed during an RF/analog SI training sequence of an SI training sequence. Subsequently, the slave node may measure the magnitude $P_{SI}$ of the SI signal remaining during the AGC sequence. Also, by using the two signals, the magnitude $P_E$ of a signal to be received during the data transmission period may be calculated as the following Equation 17:

$$P_E = 10 \cdot \log(10^{P_D/10} + 10^{P_{SI}/10}) \qquad \text{[Equation 17]}$$

The value required for the gain control may be set by the difference between the magnitude $P_D$ of the desired signal and the ADC target value $P_t$ in the half-duplex mode, and the ADC target power $P_T$ of the actual IFD may be a value obtained by adding gain $G_T$ to $P_E$ as expressed in the following Equation 18:

$$P_T = P_E + (P_t - P_D) = P_E + G_T \qquad \text{[Equation 18]}$$

Subsequently, the total gain necessary for the gain adjustment may be expressed as the following Equation 19:

$$\text{Total Gain} = G_{LNA} + G_{VGA} + G_T \qquad \text{[Equation 19]}$$

where $G_{LNA}$ may be the current LNA gain, $G_{VGA}$ may be the current VGA gain, and $G_T$ may be gain needed to be adjusted.

The gain may be adjusted by distributing the value of $G_T$ among the LNA and the VGA, which are RF/analog gain adjustment devices.

When an ADC input dynamic range value $P_{TM}$ at which $P_T$, which is the value obtained by adding the gain $G_T$ to the magnitude $P_E$, may be entered to the maximum is exceeded, $P_T$ may be replaced with $P_{TM}$, and the gain may be adjusted to a value obtained by subtracting $P_E$ from $P_{TM}$. By using the ADC target value and the gain value obtained in this way, it is possible to adjust the LNA/VGA gain of the RF/analog.

if $P_T > P_{TM}$ $$P_T \leftarrow P_{TM}, G_T = P_{TM} - P_E \quad \text{[Equation 20]}$$

Like the slave node, the master node may measure $P_D$ during the SI training sequence of the slave node and measure $P_{SI}$ during the SI training sequence of the master node to perform gain adjustment.

FIG. 17 is a flowchart showing a gain adjustment method of an RF/analog receiver.

Referring to FIG. 17, a signal input to the ADC during the data transmission period is obtained by adding a signal received from a counter IFD system to an SI signal from which only RF/analog SI cancellation is performed. It is possible to perform accurate gain adjustment only when the magnitude of the SI signal and the magnitude of the desired signal (DS) are known. Accordingly, the slave node may check the beacon signal transmitted by the master node and the magnitudes of the two signals during the slave SI training period, and the master node may check the magnitudes of the two signals during the slave SI training period and the master SI training period.

First, the slave node may measure the magnitude $P_D$ of the desired signal (DS) while the beacon signal is received from the master node (S110).

Subsequently, the slave node may compute an SI cancellation filter factor during the RF/analog SI training sequence of the SI training sequence, perform RF/analog SI cancellation, and then measure the magnitude $P_{SI}$ of the SI signal remaining during the AGC sequence (S120). Also, the magnitude $P_E$ of a signal to be received during the data transmission period may be calculated by adding the two signals (S130).

Subsequently, the slave node may calculate the ADC target power $P_T$ of the actual IFD by adding the gain $G_T$ to the magnitude $P_E$ of the signal to be received during the data transmission period.

Subsequently, the slave node compares $P_T$, which is a value obtained by adding the gain $G_T$ to the magnitude $P_E$, to the ADC input dynamic area value $P_{TM}$ capable of being entered to the maximum. In this case, the slave node determines whether the ADC input dynamic area value $P_{TM}$ capable of being entered to the maximum is greater than $P_T$, which is a value obtained by adding the gain $G_T$ to the magnitude $P_E$ (S150).

When a result of the determination in S150 is that $P_T$ is not larger than $P_{TM}$, the slave node may adjust $P_T$ to be the same as $P_{TM}$ or adjust the gain $G_T$ to a value obtained by subtracting $P_E$ from $P_{TM}$ (S160).

Subsequently, the slave node may adjust the gains of the LAN and the VGA (S170).

When a result of the determination in S150 is that $P_T$ is larger than $P_{TM}$, the slave node may adjust the gains of the LNA and the VGA without performing S160 (S170).

Like the slave node, the master node may measure $P_D$ during the SI training sequence of the slave node and measure $P_{SI}$ during the SI training sequence of the master node to perform gain adjustment.

The in-band full-duplex transceiving method and apparatus according to an embodiment of the present invention may adjust the RF/analog signal gain between the master node and the slave node of the IFD communication system so that the IFD communication system can stably operate even in an environment where a channel is dynamically changed. In addition, by reducing an input signal range of the ADC, it is possible to reduce power consumption of the entire system through the use of a low-cost ADC with a narrow input range and also to save costs needed for system configuration.

The in-band full-duplex (IFD) transceiving method and apparatus of the present invention may perform AGC by performing magnitude matching between a desired signal (DS) and a self-interference (SI) signal input to an analog-to-digital converter (ADC).

The IFD transceiving method and apparatus according to an embodiment of the present invention may adjust the RF/analog signal gain between the master node and the slave node of the IFD communication system so that the IFD communication system can stably operate even in an environment where a channel is dynamically changed. Also, by reducing an input signal range of the ADC, it is possible to reduce power consumption of the entire system through the use of a low-cost ADC with a narrow input range and also to save costs needed for system configuration.

While the example embodiments of the present invention and their advantages have been described in detail, it should be understood that various changes, substitutions and alterations may be made herein without departing from the scope of the invention.

What is claimed is:

1. An operating method of a slave node that communicates with a master node in an in-band full duplex (IFD) system, the operating method comprising:
   receiving a beacon signal from the master node during a training sequence period;
   transmitting a first self-interference (SI) training sequence including a first radio frequency (RF) analog SI training sequence, a first automatic gain control (AGC) sequence, and a first digital SI training sequence to the master node during the training sequence period after the beacon signal is received;
   calculating a filter factor for canceling an analog SI signal input to the slave node on the basis of the first RF analog SI training sequence; and
   canceling the analog SI signal from the first AGC sequence on the basis of the filter factor.

2. The operating method of claim 1, further comprising:
   adjusting gain of a data signal on the basis of strength of the beacon signal and strength of a residual SI signal remaining after the analog SI signal is canceled from the first AGC sequence;
   calculating a digital filter factor for canceling the residual SI signal on the basis of the first digital SI training sequence after the gain of the data signal is adjusted; and
   canceling the residual SI signal on the basis of the digital filter factor and the adjusted gain,
   demodulating the data signal received from the master node according to an IFD scheme during a data transmission period after the training sequence period.

3. The operating method of claim 2, wherein the adjusting of the gain of the data signal comprises:
   calculating a third strength by adding a first strength of a desired signal measured based on the beacon signal to a second strength of the residual SI signal; and
   adjusting the gain of the data signal on the basis of the third strength.

4. The operating method of claim 3, wherein the gain of the data signal is adjusted to be within a dynamic range of an analog-to-digital converter (ADC) of the slave node.

5. The operating method of claim 1, wherein the beacon signal includes an IFD information field and a sequence field for signal sensing and gain adjustment.

6. The operating method of claim 1, wherein the first ACG sequence of the first SI training sequence is located between the first RF analog SI training sequence and the first digital SI training sequence.

7. The operating method of claim 2, further receiving a second SI training sequence from the master node after transmitting the first SI training sequence,
wherein the second SI training sequence is used by the master node to cancel an SI signal, and the data signal is received from the master node during the data transmission period after the second SI training sequence is received.

8. The operating method of claim 7, wherein the second SI training sequence includes a second RF analog SI training sequence, a second AGC sequence, and a second digital SI training sequence, and the second AGC sequence is located between the second RF analog SI training sequence and the second digital SI training sequence.

9. An operating method of a master node that communicates with a slave node in an in-band full duplex (IFD) system, the operating method comprising:
transmitting a beacon signal during a training sequence period;
receiving a first self-interference (SI) training sequence from the slave node after the slave node receives the beacon signal during the training sequence period;
transmitting a second SI training sequence including a second radio frequency (RF) analog SI training sequence, a second automatic gain control (AGC) sequence, and a second digital SI training sequence to the slave node during the training sequence period after the first SI training sequence is received;
calculating a filter factor for canceling an analog SI signal input to the master node on the basis of the second RF analog SI training sequence; and
canceling the analog SI signal from the second AGC sequence on the basis of the filter factor.

10. The operating method of claim 9, further comprising:
adjusting gain of a data signal on the basis of strength of the first SI training sequence and strength of a residual SI signal remaining after the analog SI signal is canceled from the second AGC sequence;
calculating a digital filter factor for canceling the residual SI signal on the basis of the second digital SI training sequence after the gain of the data signal is adjusted; and
canceling the residual SI signal on the basis of the digital filter factor and the adjusted gain,
demodulating the data signal received from the slave node according to an IFD scheme during a data transmission period after the training sequence period.

11. The operating method of claim 10, wherein the adjusting of the gain of the data signal comprises:
calculating a third strength by adding a first strength of a desired signal measured on the basis of the first SI training sequence to a second strength of the residual SI signal; and
adjusting the gain of the data signal on the basis of the third strength.

12. The operating method of claim 11, wherein the gain of the data signal is adjusted to be within a dynamic range of an analog-to-digital converter (ADC) of the master node.

13. The operating method of claim 9, wherein the beacon signal includes an IFD information field and a sequence field for signal sensing and gain adjustment.

14. The operating method of claim 9, wherein the first SI training sequence includes a first RF analog SI training sequence, a first AGC sequence, and a first digital SI training sequence and is used by the slave node to cancel an SI signal.

15. A slave node that communicates with a master node in an in-band full duplex (IFD) system, the slave node comprising:
a processor; and
a memory configured to store at least one command executed by the processor,
wherein the at least one command is executed to:
receive a beacon signal from the master node during a training sequence period;
transmit a first self-interference (SI) training sequence including a first radio frequency (RF) analog SI training sequence, a first automatic gain control (AGC) sequence, and a first digital SI training sequence to the master node during the training sequence period after the beacon signal is received;
calculate a filter factor for canceling an analog SI signal input to the slave node on the basis of the first RF analog SI training sequence; and
cancel the analog SI signal from the first AGC sequence on the basis of the filter factor.

16. The slave node of claim 15, wherein the at least one command is further executed to:
adjust gain of the data signal on the basis of strength of the beacon signal and strength of a residual SI signal remaining after the analog SI signal is canceled from the first AGC sequence;
calculate a digital filter factor for canceling the residual SI signal on the basis of the first digital SI training sequence after the gain of the data signal is adjusted; and
cancel the residual SI signal on the basis of the digital filter factor and the adjusted gain,
demodulate the data signal received from the master node according to an IFD scheme during a data transmission period after the training sequence period.

17. The slave node of claim 16, wherein when the gain of the beacon signal is adjusted, the at least one command is executed to:
calculate a third strength by adding a first strength of a desired signal measured based on the beacon signal to a second strength of the residual SI signal; and
adjust the gain of the data signal on the basis of the third strength.

18. The slave node of claim 17, wherein the gain of the data signal is adjusted to be within a dynamic range of an analog-to-digital converter (ADC) of the slave node.

19. The slave node of claim 15, wherein the beacon signal includes an IFD information field and a sequence field for signal sensing and gain adjustment.

20. The slave node of claim 16,
wherein the at least one command is further executed to receive a second SI training sequence from the master node after transmitting the first SI training sequence; and
wherein the second SI training sequence is used by the master node to cancel an SI signal, and the data signal is received from the master node during the data transmission period after the second SI training sequence is received.

\* \* \* \* \*